(12) United States Patent
Wang et al.

(10) Patent No.: US 11,825,474 B2
(45) Date of Patent: Nov. 21, 2023

(54) SERVICE TRANSMISSION METHOD AND APPARATUS

(71) Applicant: HUAWEI TECHNOLOGIES CO., LTD., Guangdong (CN)

(72) Inventors: Hejun Wang, Shenzhen (CN); Mingchao Li, Beijing (CN); Hang Liu, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 388 days.

(21) Appl. No.: 16/992,425

(22) Filed: Aug. 13, 2020

(65) Prior Publication Data

US 2020/0374862 A1  Nov. 26, 2020

Related U.S. Application Data

(63) Continuation of application No. PCT/CN2018/076767, filed on Feb. 13, 2018.

(51) Int. Cl.
*H04W 72/00* (2023.01)
*H04W 72/20* (2023.01)
(Continued)

(52) U.S. Cl.
CPC ........... *H04W 72/20* (2023.01); *H04L 1/0003* (2013.01); *H04L 5/0053* (2013.01);
(Continued)

(58) Field of Classification Search
CPC ............. H04W 72/0406; H04W 76/14; H04W 28/0268; H04W 72/0453; H04W 72/085;
(Continued)

(56) References Cited

U.S. PATENT DOCUMENTS

2016/0295624 A1   10/2016  Novlan et al.
2017/0188375 A1    6/2017  Seo et al.
(Continued)

FOREIGN PATENT DOCUMENTS

CN    102487509 A    6/2012
CN    104052572 A    9/2014
(Continued)

OTHER PUBLICATIONS

Office Action issued in Chinese Application No. 202010686396.5 dated Feb. 1, 2021, 11 pages (with English translation).
(Continued)

*Primary Examiner* — Rhonda L Murphy
(74) *Attorney, Agent, or Firm* — Fish & Richardson P.C.

(57) ABSTRACT

This disclosure provides a service transmission method. The terminal device determines, based on a relationship between radio resource information and transmission characteristic information, a first transmission resource set supporting a first transmission characteristic, when determining to transmit service data by using the first transmission characteristic, selects a direct link transmission resource from the first transmission resource set supporting the first transmission characteristic to transmit the service data, and transmits the service data on the selected direct link transmission resource.

15 Claims, 9 Drawing Sheets

(51) Int. Cl.
*H04W 76/14* (2018.01)
*H04L 1/00* (2006.01)
*H04L 5/00* (2006.01)
*H04W 28/02* (2009.01)
*H04W 72/0453* (2023.01)
*H04W 72/50* (2023.01)
*H04W 72/542* (2023.01)
*H04W 4/46* (2018.01)

(52) U.S. Cl.
CPC ... *H04W 28/0268* (2013.01); *H04W 72/0453* (2013.01); *H04W 72/535* (2023.01); *H04W 72/542* (2023.01); *H04W 76/14* (2018.02); *H04W 4/46* (2018.02)

(58) Field of Classification Search
CPC .. H04W 72/1257; H04W 4/46; H04L 1/0003; H04L 5/0053
See application file for complete search history.

(56) References Cited

U.S. PATENT DOCUMENTS

| | | | |
|---|---|---|---|
| 2017/0303240 A1 | 10/2017 | Basu Mallick et al. | |
| 2018/0324010 A1* | 11/2018 | Gulati | H04L 27/04 |

FOREIGN PATENT DOCUMENTS

| | | |
|---|---|---|
| CN | 105281866 A | 1/2016 |
| CN | 106559337 A | 4/2017 |
| CN | 106793090 A | 5/2017 |
| EP | 3386258 A1 | 10/2018 |
| WO | 2017166141 A1 | 10/2017 |

OTHER PUBLICATIONS

3GPP TS 24.386 V14.3.0 (Dec. 2017),3rd Generation Partnership Project Technical Specification Group Core Network and Terminals,User Equipment (UE) to V2X control function,protocol aspects,Stage 3(Release 14), 35 pages.
3GPP TS 36.213 V15.0.0 (Dec. 2017),3rd Generation Partnership Project,Technical Specification Group Radio Access Network,Evolved Universal Terrestrial Radio Access (E-Utra),Physical layer procedures(Release 15), 493 pages.
3GPP TS 36.321 V15.0.0 (Dec. 2017),3rd Generation Partnership Project,Technical Specification Group Radio Access Network, Evolved Universal Terrestrial Radio Access (E-UTRA),Medium Access Control (MAC) protocol specification (Release 15), 109 pages.
3GPP TS 36.323 V14.5.0 (Dec. 2017),3rd Generation Partnership Project,Technical Specification Group Radio Access Network,Evolved Universal Terrestrial Radio Access (E-UTRA),Packet Data Convergence Protocol (PDCP) specification(Release 14), 43 pages.
3GPP TS 36.331 V15.0.1 (Jan. 2018),3rd Generation Partnership Project,Technical Specification Group Radio Access Network, Evolved Universal Terrestrial Radio Access (E-UTRA),Radio Resource Control (RRC),Protocol specification (Release 15), 776 pages.
PCT International Search Report and Written Opinion in International Application No. PCT/CN2018/076,767, dated Jun. 29, 2018, 18 pages (With English Translation).
Extended European Search Report issued in European Application No. 18906069.2 dated Dec. 1, 2020, 8 pages.

* cited by examiner

SERVICE TRANSMISSION METHOD AND APPARATUS

CROSS-REFERENCE TO RELATED APPLICATIONS

This application is a continuation of International Application No. PCT/CN2018/076767, filed on Feb. 13, 2018, the disclosure of which is hereby incorporated by reference in its entirety.

TECHNICAL FIELD

This application relates to the field of communications technologies, and in particular, to a service transmission method and apparatus.

BACKGROUND

With continuous development of the society, vehicles are increasingly popularized. Vehicles bring convenience to people in travelling, and have some negative impacts on human society. A rapid increase in a quantity of vehicles causes a series of problems such as urban traffic congestion, frequent traffic accidents, and worse environment quality. In view of personal safety, travelling efficiency, environmental protection, economic effects, and the like, a set of perfect Intelligent Transportation System (ITS) is needed. Therefore, the ITS has certainly become a worldwide focus.

Currently, a vehicle may obtain traffic reporting or receive service information in time through vehicle to vehicle (V2V) communication, vehicle to infrastructure (V2I) communication (for example, the infrastructure is a road side unit (RSU)), vehicle to pedestrian (V2P) communication, or vehicle to network (V2N) communication. These communication manners may be collectively referred to as V2X communication (X represents everything). As shown in FIG. 1, the most frequently used V2V and V2I are used as an example. A vehicle 1 communicates with a vehicle 2 through the V2V communication, and the vehicle 1 and the vehicle 2 may exchange information such as a vehicle speed, a driving direction, a specific position, and whether an emergency brake is slammed on. In this way, the vehicle 1 can better learn a traffic condition outside a visual distance by using the foregoing obtained information of the vehicle 2, to foresee and avoid dangerous conditions. For the V2I communication, in addition to exchange of the foregoing information, the RSU may further provide the vehicle with various types of service information and data network access. Functions such as no parking charge and vehicle-mounted entertainment greatly improve traffic intelligence. A network used for the V2X communication is usually referred to as internet of vehicles.

Long term evolution (LTE) is a current mainstream wireless communications technology. A device-to-device (D2D) technology is used as an important feature and is standardized, and supports direct communication between terminal devices. Because some V2X services (for example, V2V/V2I) communication scenarios also belong to the direct communication of the terminal device, a V2X service may be transmitted by using a D2D technology. However, in an actual process, during direct communication between two or more terminal devices (for example, vehicles), because message transmission between vehicles is blocked due to a barrier (for example, a building) between vehicles, or due to a requirement that a vehicle needs to propagate a message farther, the vehicle may first transmit a message to a base station, and then the base station transmits the message to another vehicle to implement communication of the internet of vehicles. An interface through which the vehicle performs direct communication with a surrounding vehicle may be referred to as a PC5 interface, and uses a dedicated frequency band (for example, 5.9 GHz) of the internet of vehicles. An interface between the vehicle and the base station may be referred to as a Uu interface, and uses a cellular network frequency band (for example, 1.8 GHz).

Therefore, as shown in FIG. 2, a V2X message may be sent between the vehicle 1 and the vehicle 2 through direct communication, or may be forwarded by the base station. As shown in FIG. 3, the vehicle 1 may send the V2X message to the base station, and then the base station sends the V2X message to the vehicle 2. However, this manner of using the base station consumes more signaling and resources, and the direct communication cannot be normally used in some cases (for example, building blocking). Therefore, the network needs to configure, based on conditions such as a network status or a service requirement of the terminal device, dynamic switching between the forwarding by the base station and the direct communication on the terminal device.

A first transmission mode is introduced in Long Term Evolution (LTE) of the 3rd Generation Partnership Project (3GPP). For some enhanced services such as platooning transmitted in the V2X message, transmission characteristics such as 64-quadrature amplitude modulation (QAM) and transmit diversity that are incompatible with a second transmission mode are introduced in the first transmission mode. Therefore, a terminal device that is required to support the first transmission mode needs to support both a road safety service, for example, a cooperative awareness message (CAM) and a decentralized congestion control message (DENM), defined in the second transmission mode and an enhanced service, for example, platooning, defined in a version of the first transmission mode. Correspondingly, the terminal device supporting the first transmission mode needs to support the first transmission mode and the second transmission mode, where the first transmission mode includes one or more transmission characteristics that are incompatible with the second transmission mode. The second transmission mode includes one or more transmission characteristics defined in the second transmission mode and one or more transmission characteristics that are compatible with the second transmission mode and that are defined in the first transmission mode.

When the terminal device supporting the first transmission mode sends service data in the second transmission mode, the terminal device supporting the first transmission mode may normally communicate with a terminal device supporting the second transmission mode. However, when the terminal device supporting the second transmission mode transmits, in the first transmission mode, the V2X message to the terminal device supporting the second transmission mode, the terminal device supporting the second transmission mode cannot correctly parse out the V2X message sent by the terminal device supporting the first transmission mode. In this case, when the terminal device supporting the first transmission mode and the terminal device supporting the second transmission mode operate in a same time-frequency resource, the terminal device supporting the first transmission mode causes interference to the terminal device supporting the second transmission mode, and consequently, a channel environment of the terminal device supporting the second transmission mode deteriorates.

SUMMARY

This application provides a service transmission method and apparatus, to resolve communication compatibility and coexistence problems between terminal devices operating in different transmission modes.

According to a first aspect, this application provides a service transmission method, where the solution includes: obtaining, by a terminal device, first configuration information, where the first configuration information includes radio resource information and transmission characteristic information corresponding to the radio resource information; obtaining, by the terminal device, service data, when the terminal device determines to transmit the service data by using a first transmission characteristic, selecting, by the terminal device, a direct link transmission resource from a first transmission resource set corresponding to the radio resource information, where the first transmission characteristic is a transmission characteristic supported by the transmission characteristic information; and transmitting, by the terminal device, the service data on the direct link transmission resource by using the first transmission characteristic.

In the service transmission method provided in this application, the terminal device first determines an association relationship between radio resource information and transmission characteristic information, where the transmission characteristic information may be used to determine the first transmission characteristic, and the radio resource information may be used to determine the transmission resource set. Therefore, the terminal device may determine, based on the association relationship between radio resource information and transmission characteristic information, the first transmission resource set supporting the first transmission characteristic. When determining to transmit obtained service data by using the first transmission characteristic, the terminal device may select a direct link transmission resource from the first transmission resource set supporting the first transmission characteristic to transmit the service data, and transmit the service data on the selected direct link transmission resource by using the first transmission characteristic. Because different transmission resource sets may be corresponding to different transmission characteristics, interference to another terminal device caused when the terminal device transmits, on different transmission resource sets, the service data by using the transmission characteristic supported by the transmission resource set can be avoided, thereby resolving problems of communication compatibility and coexistence between terminal devices that use different transmission characteristics or operate in different transmission modes.

In a possible design, the radio resource information is a first transmission carrier frequency identifier, the first configuration information includes the first transmission carrier frequency identifier and transmission characteristic information corresponding to the first transmission carrier frequency identifier, and when the terminal device determines to transmit the service data by using a first transmission characteristic, before the selecting, by the terminal device, a direct link transmission resource from a first transmission resource set corresponding to the radio resource information, the method provided in this application further includes: determining, by the terminal device based on the first transmission carrier frequency identifier, all available direct link transmission resources on a first transmission carrier frequency corresponding to the first transmission carrier frequency identifier, and determining, by the terminal device, all the available direct link transmission resources of the first transmission carrier frequency as the first transmission resource set corresponding to the radio resource information; or determining, by the terminal device based on the first transmission carrier frequency identifier, a transmission resource pool used by the terminal device on a first transmission carrier frequency corresponding to the first transmission carrier frequency identifier, and determining, by the terminal device, all direct link transmission resources on the used transmission resource pool as the first transmission resource set corresponding to the radio resource information. Because a transmission resource pool allocated to another terminal device may exist on the first transmission carrier frequency of the terminal device, the first transmission resource set corresponding to the radio resource information is determined based on all the available direct link transmission resources on the first transmission carrier frequency corresponding to the first transmission carrier frequency identifier or the transmission resource pool used by the terminal device on the first transmission carrier frequency, to establish a mapping relationship between radio resource information and first transmission resource set, thereby determining different transmission characteristics respectively configured for different transmission carrier frequencies or different transmission resource pools.

In a possible design, the radio resource information is a first transmission resource pool identifier, the first configuration information includes the first transmission resource pool identifier and transmission characteristic information corresponding to the first transmission resource pool identifier, and when the terminal device determines to transmit the service data by using a first transmission characteristic, before the selecting, by the terminal device, a direct link transmission resource from a first transmission resource set corresponding to the radio resource information, the method provided in this application includes: determining, by the terminal device based on the first transmission resource pool identifier, a transmission resource pool corresponding to the first transmission resource pool identifier on the first transmission carrier frequency, and determining all available direct link transmission resources on the transmission resource pool corresponding to the first transmission resource pool identifier as the first transmission resource set corresponding to the radio resource information. The transmission resource pool corresponding to the first transmission resource pool identifier is determined on the first transmission carrier frequency based on the first transmission resource pool identifier, and all the available direct link transmission resources on the transmission resource pool corresponding to the first transmission resource pool identifier are determined, on the first transmission carrier frequency, as the first transmission resource set corresponding to the radio resource information, to establish a relationship between all available direct link transmission resources on the transmission resource pool and radio resource information. In this way, the terminal device can select a direct link transmission resource from a transmission resource pool on a transmission carrier frequency to transmit the service data. In addition, when a plurality of transmission resource pools on a transmission carrier frequency are corresponding to different transmission characteristics, one transmission carrier frequency may be corresponding to a plurality of transmission characteristics.

In a possible design, the first transmission characteristic is 64-quadrature amplitude modulation QAM, and transmission characteristic information corresponding to the first transmission characteristic includes one or more types of the following information: first indication information, where the first indication information is used to indicate that 64QAM is supported; first modulation and coding scheme (MCS) configuration information, where the first MCS configuration information includes configuration information of supporting 64QAM; or second MCS configuration information, where the second MCS configuration information includes one or more of a first minimum MCS index and a first maximum MCS index that are used by the terminal device, and a determined MCS index range of the one or more of the first minimum MCS index and the first maximum MCS index in a first MCS index table includes an MCS index of supporting 64QAM. The foregoing fields are carried in the transmission characteristic information, so that the first transmission characteristic supported by the transmission characteristic information is determined as 64QAM based on the transmission characteristic information.

In a possible design, the first transmission characteristic is using a second MCS index table, transmission characteristic information corresponding to the first transmission characteristic includes one or more of a second minimum MCS index and a second maximum MCS index that are used by the terminal device, and the second MCS index table is an MCS index table of supporting 64QAM on the direct link transmission resource; and the transmitting, by the terminal device, the service data on the direct link transmission resource by using the first transmission characteristic includes: selecting, by the terminal device, a first MCS for the service data in the second MCS index table based on the second minimum MCS index and/or the second maximum MCS index; and transmitting, by the terminal device, the service data on the direct link transmission resource by using the first MCS, and adding second MCS index table indication information and an index corresponding to the first MCS to corresponding direct link control information. The one or more of the second minimum MCS index and the second maximum MCS index is/are carried in transmission communication information, so that the terminal device selects the first MCS for the service data based on the one or more of the second minimum MCS index and the second maximum MCS index.

In a possible design, the first transmission characteristic is transmit diversity, and transmission characteristic information corresponding to the first transmission characteristic includes one or more types of the following information: second indication information, where the second indication information is used to indicate that the transmit diversity is supported; or transmit diversity configuration information, where the transmit diversity configuration information includes one or more of an identifier of a quantity of antenna ports, a codebook subset constraint identifier, a transmit antenna selection identifier, an identifier of a maximum quantity of layers, or an optional codebook enabler identifier. The foregoing fields are carried in the transmission characteristic information, so that the first transmission characteristic supported by the transmission characteristic information is determined as the transmit diversity based on the transmission characteristic information.

In a possible design, the method provided in this application further includes: obtaining, by the terminal device, a first identifier corresponding to the radio resource information and/or the transmission characteristic information, where the first identifier is corresponding to a parameter value/parameter values of one or more first parameters of the service data, and the one or more first parameters include one or more of a service type identifier, a proximity service per-packet priority (PPPP) identifier, a quality of service (QoS) identifier, a reliability identifier, a bearer identifier, a delay identifier, a transmission rate identifier, or a vehicle speed identifier; and that the terminal device determines to transmit the service data by using a first transmission characteristic includes: determining, by the terminal device, a second identifier corresponding to the service data, where the second identifier is corresponding to the parameter value/parameter values of one or more first parameters of the service data; and when the terminal device determines that a parameter value of a first parameter corresponding to the second identifier is the same as a parameter value of a first parameter corresponding to the first identifier, determining, by the terminal device, to transmit the service data by using the first transmission characteristic. A correspondence between one or more first parameters and radio resource information and/or transmission characteristic information is obtained. Therefore, after the service data is received, it may be determined, based on a parameter value/parameter values of one or more first parameters corresponding to the second identifier corresponding to the service data and a parameter value of a first parameter corresponding to the first identifier, whether to transmit the service data by using the first transmission characteristic. For example, when the parameter value of the first parameter corresponding to the second identifier corresponding to the service data is the same as the parameter value of the first parameter corresponding to the first identifier, it may be determined to transmit the service data by using the first transmission characteristic.

In a possible design, the method provided in this application further includes: obtaining, by the terminal device, a first threshold corresponding to the radio resource information and/or the transmission characteristic information, where the first threshold is corresponding to a threshold/thresholds of one or more first parameters of the service data, and the one or more first parameters include one or more of a service type identifier, a proximity service per-packet priority PPPP, a quality of service QoS identifier, a reliability identifier, a bearer identifier, a delay identifier, or a transmission rate identifier; and that the terminal device determines to transmit the service data by using a first transmission characteristic includes: determining, by the terminal device, a second identifier corresponding to the service data, where the second identifier is corresponding to a parameter value/parameter values of one or more first parameters of the service data; and determining, by the terminal device based on a relationship between the first threshold and the parameter value/parameter values of one or more first parameters corresponding to the second identifier, to transmit the service data by using the first transmission characteristic. Therefore, it may be determined to transmit the service data by using the first transmission characteristic.

In a possible design, the determining, by the terminal device based on a relationship between the first threshold and the parameter value/parameter values of one or more first parameters corresponding to the second identifier, to transmit the service data by using the first transmission characteristic includes: when the terminal device determines that a parameter value of any one of the one or more first parameters corresponding to the second identifier is less than or equal to the first threshold, determining, by the terminal device, to transmit the service data by using the first transmission characteristic; or when the terminal device determines that a parameter value of any one of the one or more first parameters corresponding to the service data is greater than or equal to the first threshold, determining, by the terminal device, to transmit the service data by using the first transmission characteristic. Based on whether a parameter value of any one of the first parameters is greater than, equal to, or less than the first threshold, when the parameter value of any one of the first parameters meets a condition of the foregoing first threshold, the terminal device may determine to transmit the service data by using the first transmission characteristic.

In a possible design, the method provided in this application further includes: obtaining, by the terminal device, a congestion degree threshold corresponding to the radio resource information and/or the transmission characteristic information; and correspondingly, that the terminal device determines to transmit the service data by using a first transmission characteristic includes: determining, by the terminal device based on a relationship between a congestion degree of the transmission resource pool used by the terminal device and the congestion degree threshold, to transmit the service data by using the first transmission characteristic; or determining, by the terminal device based on a relationship between a congestion degree of a transmission carrier frequency used by the terminal device and the congestion degree threshold, to transmit the service data by using the first transmission characteristic. Based on the congestion degree threshold corresponding to the radio resource information and/or the transmission characteristic information, when the congestion degree of the transmission resource pool used by the terminal device or the congestion degree of the transmission carrier frequency used by the terminal device meets the foregoing condition, it may be determined to transmit the service data by using the first transmission characteristic.

In a possible design, the determining, by the terminal device based on a relationship between a congestion degree of the transmission resource pool used by the terminal device and the congestion degree threshold, to transmit the service data by using the first transmission characteristic includes: when the terminal device determines that the congestion degree of the used transmission resource pool is less than or equal to the congestion degree threshold, determining, by the terminal device, to transmit the service data by using the first transmission characteristic; or when the terminal device determines that the congestion degree of the used transmission resource pool is greater than or equal to the congestion degree threshold, determining, by the terminal device, to transmit the service data by using the first transmission characteristic. By determining the relationship between a congestion degree of the used transmission resource pool and a congestion degree threshold, when the congestion degree of the transmission resource pool meets the congestion degree threshold, it is determined whether to trigger to transmit the service data by using the first transmission characteristic.

In a possible design, the determining, by the terminal device based on a relationship between a congestion degree of a transmission carrier frequency used by the terminal device and the congestion degree threshold, to transmit the service data by using the first transmission characteristic includes: when the terminal device determines that the congestion degree of the used transmission carrier frequency is less than or equal to the congestion degree threshold, determining, by the terminal device, to transmit the service data by using the first transmission characteristic; or when the terminal device determines that the congestion degree of the used transmission carrier frequency is greater than or equal to the congestion degree threshold, determining, by the terminal device, to transmit the service data by using the first transmission characteristic. By determining the relationship between a congestion degree of the used transmission carrier frequency and a congestion degree threshold, when the congestion degree of the transmission carrier frequency meets the congestion degree threshold, it is determined whether to trigger to transmit the service data by using the first transmission characteristic.

In a possible design, the method provided in this application further includes: obtaining, by the terminal device, a congestion degree range corresponding to the radio resource information and/or the transmission characteristic information, and correspondingly, that the terminal device determines to transmit the service data by using a first transmission characteristic includes: determining, by the terminal device based on a relationship between a congestion degree of the transmission resource pool used by the terminal device and the congestion degree range, to transmit the service data by using the first transmission characteristic; or determining, by the terminal device based on a relationship between a congestion degree of a transmission carrier frequency used by the terminal device and the congestion degree range, to transmit the service data by using the first transmission characteristic. By using the congestion degree of the used transmission resource pool or the congestion degree of the used transmission carrier frequency, it may be determined, based on a relationship between the congestion degree range and the congestion degree of the used transmission resource pool or the congestion degree of the used transmission carrier frequency, whether the service data needs to be transmitted by using the first transmission characteristic.

In a possible design, the determining, by the terminal device based on a relationship between a congestion degree of the transmission resource pool used by the terminal device and the congestion degree range, to transmit the service data by using the first transmission characteristic includes: when the terminal device determines that the congestion degree of the used transmission resource pool is within the congestion degree range, determining, by the terminal device, to transmit the service data by using the first transmission characteristic; or the determining, by the terminal device based on a relationship between a congestion degree of a transmission carrier frequency used by the terminal device and the congestion degree range, to transmit the service data by using the first transmission characteristic includes: when the terminal device determines that the congestion degree of the used transmission carrier frequency is within the congestion degree range, determining, by the terminal device, to transmit the service data by using the first transmission characteristic. After obtaining the congestion degree of the used transmission carrier frequency, when the congestion degree of the used transmission carrier frequency meets the congestion degree range, the terminal device may determine to transmit the service data by using the first transmission characteristic.

In a possible design, that the terminal device determines, based on whether service data transmitted by using one or more transmission characteristics supported by the second transmission mode exists in the used transmission resource pool or the used transmission carrier frequency, whether to transmit the service data by using the first transmission mode includes: monitoring, by the terminal device, the used transmission resource pool or the used transmission carrier frequency, receiving and trying to parse the received signal, and measuring strength of the received signal. If the received signal is successfully parsed and the signal is transmitted in the second transmission mode, and the strength of the signal is greater than or equal to the first threshold, the terminal device does not transmit the service data in the first transmission mode; or if the terminal device fails to parse the signal received in the used transmission resource pool or the used transmission carrier frequency, or successfully parses the signal, but the strength of the signal is less than or equal to the first threshold, the terminal device may transmit the service data in the first transmission mode or by using the first transmission characteristic in the used transmission resource pool or the used transmission carrier frequency. In this way, it is determined whether to trigger to transmit the service data in the first transmission mode by determining whether the service data transmitted by using the one or more transmission characteristics supported by the second transmission mode exists in the used transmission resource pool or the used transmission carrier frequency. This may reduce interference to the service data transmitted by using the one or more transmission characteristics supported by the second transmission mode.

In a possible design, the terminal device obtains configuration information, where the configuration information configures that a service flow (for example QoS flow) whose flow identifier is a flow ID to support the first transmission mode, and that the terminal device determines whether to transmit the service data in the first transmission mode includes: when the terminal device determines that the service flow of the service data is the same as the flow identifier configured in the configuration information or has a mapping relationship with the flow identifier configured in the configuration information, determining, by the terminal device, to transmit the service data in the first transmission mode or by using the first transmission characteristic.

In a possible design, the terminal device may determine, based on one or more bits in bits reserved in control information (for example SA) of the service data, whether to transmit the service data by using the first transmission characteristic, or use one or more fields in the control information of the service data to represent a transmission characteristic used for service transmission.

In a possible design, when the transmission resource pool or configuration information of the transmission carrier frequency does not indicate the transmission characteristic supported by the transmission resource pool or the transmission carrier frequency, or the supported transmission characteristic cannot be determined based on the foregoing service characteristics (including the proximity service per-packet priority PPPP, a service type, a source identifier, a destination identifier, or the like), a channel congestion degree, or the like, or a transmission mode or a transmission characteristic supported by the service flow is not configured, or there is no information such as a service characteristic or a channel congestion degree, the terminal device (a service flow of the terminal device) determines to transmit the service data in the second transmission mode.

According to a second aspect, this application provides a service transmission apparatus, where the service transmission apparatus may be a terminal device, and the service transmission apparatus may implement the service transmission method described in the first aspect and any possible design of the first aspect. For example, the service transmission apparatus may be a terminal device, or may be a chip applied to the terminal device. The foregoing method may be implemented by software, hardware, or hardware executing corresponding software.

According to the second aspect, the service transmission apparatus includes: a receiving module, configured to obtain first configuration information, where the first configuration information includes radio resource information and transmission characteristic information corresponding to the radio resource information, where the receiving module is further configured to obtain service data; a processing module, configured to: when determining to transmit, by using a first transmission characteristic, the service data received by the receiving module, select a direct link transmission resource from a first transmission resource set corresponding to the radio resource information received by the receiving module, where the first transmission characteristic is one or more types of transmission characteristic information; and a sending module, configured to transmit, by using the first transmission characteristic, the service data on the direct link transmission resource selected by the processing module.

In a possible design, the radio resource information received by the receiving module is a first transmission carrier frequency identifier, and the first configuration information received by the receiving module includes the first transmission carrier frequency identifier and transmission characteristic information corresponding to the first transmission carrier frequency identifier; and the processing module is further specifically configured to: determine, based on the first transmission carrier frequency identifier received by the receiving module, all available direct link transmission resources on a first transmission carrier frequency corresponding to the first transmission carrier frequency identifier, and determine all the available direct link transmission resources of the first transmission carrier frequency as the first transmission resource set; or the processing module is further configured to: determine a transmission resource pool used by the terminal device on a first transmission carrier frequency corresponding to the first transmission carrier frequency identifier received by the receiving module, and determine all direct link transmission resources on the used transmission resource pool as the first transmission resource set.

In a possible design, the radio resource information received by the receiving module is a first transmission resource pool identifier, the first configuration information includes the first transmission resource pool identifier and transmission characteristic information corresponding to the first transmission resource pool identifier, and the processing module is specifically configured to: determine, based on the first transmission resource pool identifier received by the receiving module, a transmission resource pool corresponding to the first transmission resource pool identifier on the first transmission carrier frequency, and determine all available direct link transmission resources on the transmission resource pool used by the terminal device as the first transmission resource set.

In a possible design, the first transmission characteristic is 64 (octal)-quadrature amplitude modulation QAM, and the first transmission characteristic includes one or more types of the following information: first indication information, where the first indication information is used to indicate that 64QAM is supported; first modulation and coding scheme (MCS) configuration information, where the first MCS configuration information includes configuration information of supporting 64-QAM; or second MCS configuration information, where the second MCS configuration information includes one or more of a first minimum MCS index and a first maximum MCS index that are used by the terminal device, and a determined MCS index range of the one or more of the first minimum MCS index and the first maximum MCS index in a first MCS index table includes an MCS index of supporting 64QAM.

In a possible design, the first transmission characteristic is using a second MCS index table, transmission characteristic information corresponding to the first transmission characteristic includes one or more of a second minimum MCS index and a second maximum MCS index that are used by the terminal device, and the second MCS index table is an MCS index table of supporting 64QAM on the direct link transmission resource; the processing module is further configured to select a first MCS for the service data in the second MCS index table based on the second minimum MCS index and/or the second maximum MCS index; and the sending module is specifically configured to: transmit the service data on the direct link transmission resource by using the first MCS, and add second MCS index table indication information and an index corresponding to the first MCS to corresponding direct link control information.

In a possible design, the first transmission characteristic is transmit diversity, and transmission characteristic information corresponding to the first transmission characteristic includes one or more types of the following information: second indication information, where the second indication information is used to indicate that the transmit diversity is supported; or transmit diversity configuration information, where the transmit diversity configuration information includes one or more of an identifier of a quantity of antenna ports, a codebook subset constraint identifier, a transmit antenna selection identifier, an identifier of a maximum quantity of layers, or an optional codebook enabler identifier.

In a possible design, the receiving module is further configured to obtain a first identifier corresponding to the radio resource information and/or the transmission characteristic information, where the first identifier is corresponding to a parameter value/parameter values of one or more first parameters of the service data, and the one or more first parameters include one or more of a service type identifier, a proximity service per-packet priority PPPP identifier, a quality of service QoS identifier, a reliability identifier, a bearer identifier, a delay identifier, a speed identifier of the terminal device, or a transmission rate identifier; and the processing module is specifically configured to: determine a second identifier corresponding to the service data obtained by the receiving module, where the second identifier is corresponding to the parameter value/parameter values of one or more first parameters of the service data; and when determining that a parameter value of a first parameter corresponding to the second identifier is the same as a parameter value of a first parameter corresponding to the first identifier, determine to transmit the service data by using the first transmission characteristic.

In a possible design, the receiving module is further configured to obtain a first threshold corresponding to the radio resource information and/or the transmission characteristic information, where the first threshold is corresponding to a threshold/thresholds of one or more first parameters of the service data, and the one or more first parameters include one or more of a service type identifier, a proximity service per-packet priority PPPP, a quality of service QoS identifier, a reliability identifier, a bearer identifier, a delay identifier, or a transmission rate identifier; and the processing module is specifically configured to: determine a second identifier corresponding to the service data obtained by the receiving module, where the second identifier is corresponding to a parameter value/parameter values of one or more first parameters of the service data; and determine, based on a relationship between the first threshold and a parameter value of any one of the one or more first parameters corresponding to the second identifier, to transmit the service data by using the first transmission characteristic.

In a possible design, the processing module is specifically configured to: when determining that a parameter value of any one of the one or more first parameters corresponding to the second identifier is less than or equal to the first threshold, determine to transmit the service data by using the first transmission characteristic; or the processing module is specifically configured to: when determining that a parameter value of any one of the one or more first parameters corresponding to the service data is greater than or equal to the first threshold, determine to transmit the service data by using the first transmission characteristic.

In a possible design, the receiving module is further configured to obtain a congestion degree threshold corresponding to the radio resource information and/or the transmission characteristic information; and correspondingly, the processing module is specifically configured to determine, based on a relationship between a congestion degree of the transmission resource pool used by the terminal device and the congestion degree threshold received by the receiving module, to transmit the service data by using the first transmission characteristic; or the processing module is specifically configured to determine, based on a relationship between a congestion degree of a transmission carrier frequency used by the terminal device and the congestion degree threshold received by the receiving module, to transmit the service data by using the first transmission characteristic.

In a possible design, the processing module is specifically configured to: when determining that the congestion degree of the used transmission resource pool is less than or equal to the congestion degree threshold, determine to transmit the service data by using the first transmission characteristic; or the processing module is specifically configured to: when determining that the congestion degree of the used transmission resource pool is greater than or equal to the congestion degree threshold, determine to transmit the service data by using the first transmission characteristic.

In a possible design, the processing module is specifically configured to: when determining that the congestion degree of the used transmission carrier frequency is less than or equal to the congestion degree threshold, determine to transmit the service data by using the first transmission characteristic; or the processing module is specifically configured to: when determining that the congestion degree of the used transmission carrier frequency is greater than or equal to the congestion degree threshold, determine to transmit the service data by using the first transmission characteristic.

In a possible design, the receiving module is further configured to obtain a congestion degree range corresponding to the radio resource information and/or the transmission characteristic information, and correspondingly, the processing module is further specifically configured to determine, based on a relationship between a congestion degree of the transmission resource pool used by the terminal device and the congestion degree range, to transmit the service data by using the first transmission characteristic; or the processing module is further specifically configured to determine, based on a relationship between a congestion degree of a transmission carrier frequency used by the terminal device and the congestion degree range, to transmit the service data by using the first transmission characteristic.

In a possible design, the processing module is further specifically configured to: when determining that the congestion degree of the used transmission resource pool is within the congestion degree range, determine to transmit the service data by using the first transmission characteristic; or the processing module is further specifically configured to: when determining that the congestion degree of the used transmission carrier frequency is within the congestion degree range, determine to transmit the service data by using the first transmission characteristic.

In addition, this application further provides a service transmission apparatus, where the service transmission apparatus includes a processor, a receiver, and a transmitter. The processor may be the processing module in the second aspect, the receiver may be the processing module in the second aspect, and the transmitter may be the sending module in the second aspect. Optionally, the service transmission apparatus in this application further includes a bus and a memory, where the memory is configured to store code and data, and the processor, the receiver, the transmitter, and the memory are coupled by using the bus.

According to a third aspect, in a possible design, the service transmission apparatus may be a terminal device or a chip applied to the terminal device, and the service transmission apparatus may include one or more processors. The one or more processors are configured to execute an instruction to support the service transmission apparatus in performing an operation related to message processing or control on the service transmission apparatus side in the first aspect and any possible design of the first aspect. Optionally, the service transmission apparatus may further include a memory, configured to be coupled to one or more processors, and store a necessary program (instruction) and data of the service transmission apparatus. In addition, optionally, the service transmission apparatus may further include a communications interface, configured to support communication between the service transmission apparatus and another network element (for example, a network device or a chip applied to the network device). The communications interface may be a transceiver circuit, and the transceiver circuit is configured to support the service transmission apparatus in performing an operation related to message receiving and sending on the service transmission apparatus side in the first aspect and any possible design of the first aspect. Optionally, the service transmission apparatus may further include a bus. For example, the memory, the communications interface, and the one or more processors may be coupled by using the bus.

According to a fourth aspect, this application provides a computer readable storage medium, where the computer readable storage medium stores an instruction, and when the instruction is run, the computer readable storage medium is configured to perform the following steps: obtaining first configuration information, where the first configuration information includes radio resource information and transmission characteristic information corresponding to the radio resource information; obtaining service data; when determining to transmit the service data by using a first transmission characteristic, selecting a direct link transmission resource from a first transmission resource set corresponding to the radio resource information, where the first transmission characteristic is a transmission characteristic supported by the transmission characteristic information; and transmitting the service data on the direct link transmission resource by using the first transmission characteristic. In addition, when the instruction is run, the computer readable storage medium is further configured to perform the service transmission method in any possible design of the first aspect.

According to a fifth aspect, this application provides a computer program product including an instruction, where the computer program product stores the instruction, and when the instruction is run, the computer program product is configured to perform the following steps: obtaining first configuration information, where the first configuration information includes radio resource information and transmission characteristic information corresponding to the radio resource information; obtaining service data; when determining to transmit the service data by using a first transmission characteristic, selecting a direct link transmission resource from a first transmission resource set corresponding to the radio resource information, where the first transmission characteristic is a transmission characteristic supported by the transmission characteristic information: and transmitting the service data on the direct link transmission resource by using the first transmission characteristic. In addition, when the instruction is run, the computer program product is further configured to perform the service transmission method in any possible design of the first aspect.

According to a sixth aspect, this application provides a chip, applied to a service transmission apparatus, where the chip includes one or more processors and interface circuits, the interface circuit is coupled to the one or more processors, and the processor is configured to run a computer program or an instruction to perform the following steps: obtaining first configuration information, where the first configuration information includes radio resource information and transmission characteristic information corresponding to the radio resource information: obtaining service data; when determining to transmit the service data by using a first transmission characteristic, selecting a direct link transmission resource from a first transmission resource set corresponding to the radio resource information, where the first transmission characteristic is a transmission characteristic supported by the transmission characteristic information: and transmitting the service data on the direct link transmission resource by using the first transmission characteristic. In addition, the processor is further configured to perform the service transmission method in any possible design of the first aspect.

Optionally, the foregoing chip in this application further includes one or more memories, and the one or more memories store an instruction.

DESCRIPTION OF EMBODIMENTS

Figure 1:
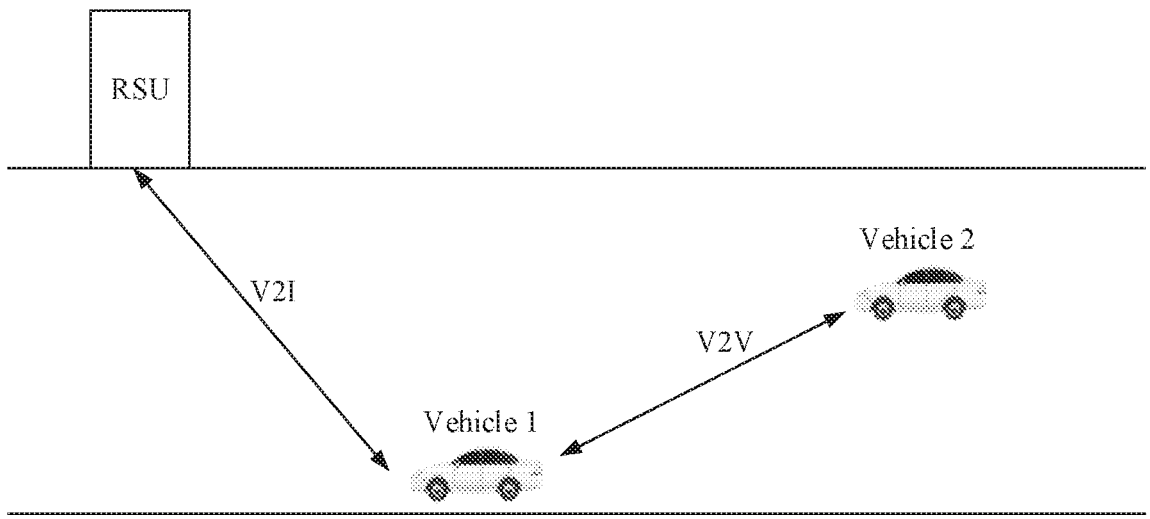
FIG. 1 is a schematic diagram of communication between vehicles.
Figure 2:
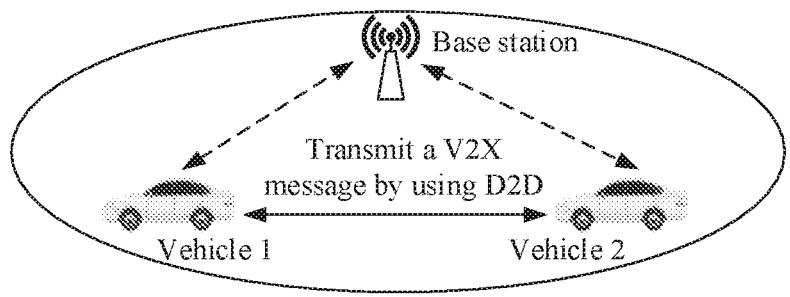
FIG. 2 is a schematic diagram of message exchange between vehicles.

This application provides a service transmission method and apparatus, to resolve communication compatibility and coexistence problems between terminal devices operating in different transmission modes. The method and apparatus are based on a same inventive concept. Because a problem-resolving principle of the device is similar to that of the method, mutual reference may be made to implementations of the method and the device, and repeated description is not provided.

In the following some terms in this application are described, to help a person skilled in the art have a better understanding.

1). Transmit diversity technology, where a basic principle is that a plurality of signal copies of same information are carried in a plurality of channels (time, frequency, space, and the like), and then a receiver separates received multi-path signals into irrelevant multi-channel signals, and combines energy of the multi-channel signals according to a specific rule to maximize energy of received desired signals. Because transmission characteristics of the channels are different, fading of the plurality of signal copies is different.

2). A transmission resource pool, which may be a transmission carrier frequency, for example, a carrier or a frequency, referring to a frequency band within a preset frequency offset of a frequency on a carrier; or a time-frequency resource on a frequency band allocated to a terminal device, and is specifically a subframe set. A start subframe number included in the subframe set indicates that a bitmap of the subframe set may be determined based on configuration information corresponding to the transmission resource pool. For example, if a frequency on a carrier 1 is A, and a preset frequency offset is B, a frequency band between A−B and A+B may be determined as the transmission resource pool.

3). A direct link transmission resource, referring to some available time-frequency resources selected from the foregoing transmission resource pool based on a request for sending service data, a feature of the service data, and a channel monitoring status, and may be specifically a physical resource block (PRB) set.

In this application, the terms "first", "second", and the like are merely used to distinguish different objects, but not limit a sequence thereof. For example, a first transmission mode and a second transmission mode are merely used to distinguish different transmission modes, and a sequence thereof is not limited.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects. In addition, one or more of A, B, and C indicate that the following relationship may exist: A exists independently, B exists independently, C exists independently, both A and B exist, both A and C exist, both B and C exist, A, B, and C exist, both A and A exist, both B and B exist, and both C and C exist.

It should be noted that, in this application, the word "an example" or "for example" is used to represent giving an example, an illustration, or a description. Any embodiment or design scheme described as an "an example" or "for example" in this application should not be explained as being more preferable or having more advantages than another embodiment or design scheme. Exactly, use of the word "an example", "for example", or the like is intended to present a related concept in a specific manner.

The following illustrates this application in detail with reference to drawings of this specification.

Figure 3:
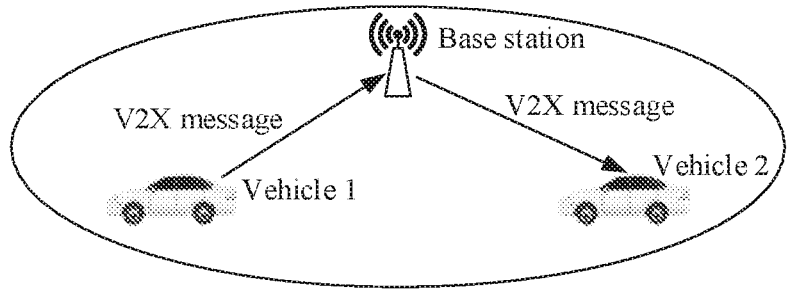
FIG. 3 is another schematic diagram of message exchange between vehicles.
Figure 4:
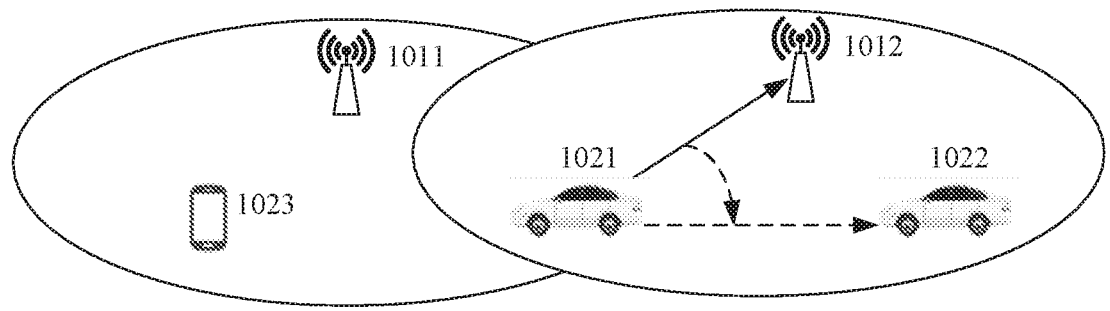
FIG. 4 is a schematic structural diagram of a transmission system according to this application.

The communication method in this application may be applicable to a plurality of system architectures. FIG. 4 is a schematic diagram of a system architecture according to this application. As shown in FIG. 4, the system architecture includes one or more network devices (for example, a first network device 1011 and a second network device 1012 shown in FIG. 3) and one or more terminal devices (for example, a first terminal device 1021, a second terminal device 1022, and a third terminal device 1023 shown in FIG. 3). The network device may cover one or more cells, and this is not specifically limited in this application.

It should be noted that a communications system shown in FIG. 4 may include a 4th generation (4G) communications system, a 5th generation (5G) communications system, or various future communications systems.

1). A terminal device, which is a device having wireless receiving and sending functions, may be deployed on land, including an indoor or outdoor device, a handheld device, or a vehicle-mounted device, or may be deployed on the water (for example, a ship), or may be deployed in the air (for example, an airplane, a balloon, and a satellite). The terminal device, also referred to as user equipment (UE), a mobile station (MS), a mobile terminal (MT), a terminal device, and the like, is a device that provides voice and/or data connectivity for a user. For example, the terminal device includes a handheld device, a vehicle-mounted device, and the like that have a wireless connection function. Currently, the terminal device may be a mobile phone, a tablet computer, a laptop computer, a palmtop computer, a mobile Internet device (MID), a wearable device (for example, a smartwatch, a smart band, a pedometer), a vehicle-mounted device (for example, a car, a bicycle, an electric vehicle, an airplane, a ship, a train, a high-speed railway), a virtual reality (VR) device, an augmented reality (AR) device, a wireless terminal in industrial control, a smart home device (for example, a refrigerator, a television, an air conditioner, and an electricity meter), an intelligent robot, a workshop device, a wireless terminal in self driving, a wireless terminal in a remote medical surgery, a wireless terminal in a smart grid, a wireless terminal in transportation safety, a wireless terminal in a smart city, a wireless terminal in a smart home, a flight device (for example, an intelligent robot, a fire balloon, a drone, and an airplane), or the like. In a possible application scenario of this application, the terminal device is a terminal device that often operates on land, for example, a vehicle-mounted device. In this application, for ease of description, a chip deployed in the foregoing device, or a chip may also be referred to as the terminal device.

The service transmission method provided in this application may be applicable to any terminal device. In the following, a terminal device operating on land is mainly used as an example for description.

2). A network device, which is a node in a radio access network, and may also be referred to as a base station or a radio access network (RAN) node (or device). Currently, for example, the network device may be a next generation NodeB (gNB), for example, a new radio (NR) NodeB (NB) or a 5G base station, a transmission reception point (TRP), an evolved NodeB (eNB), a radio network controller (RNC), a NodeB (NB), a base station controller (BSC), a base transceiver station (BTS), a home NodeB (for example, a home evolved NodeB or a home Node B, HNB), a baseband unit (BBU), or a wireless fidelity (Wifi) access point (AP).

Figure 5:
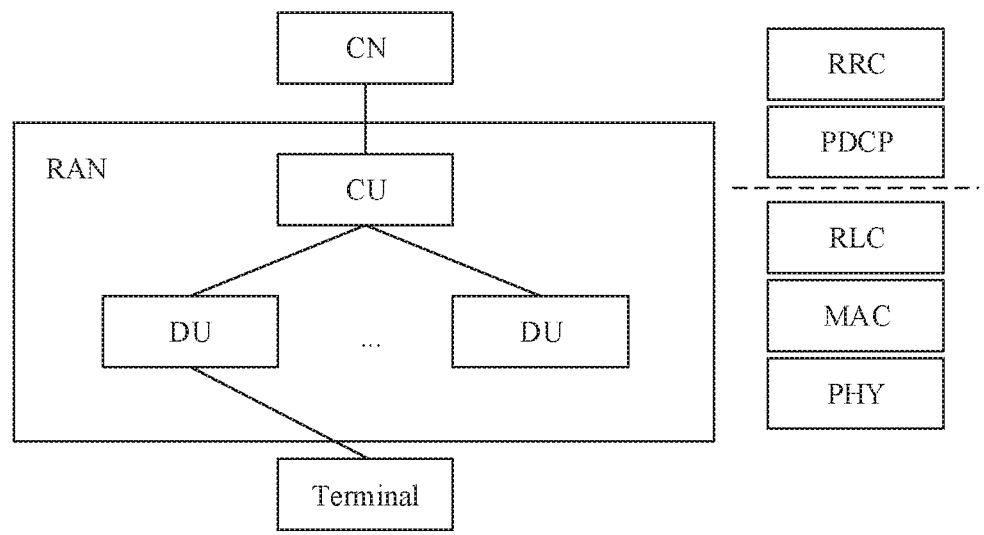
FIG. 5 is a schematic structural diagram of a base station according to this application.

A future access network may be implemented by using a cloud radio access network (C-RAN) architecture. In a possible manner, a protocol stack architecture and a function of a conventional base station are divided into two parts, one part is referred to as a central unit (CU), and the other part is referred to as a distributed unit (DU). However, an actual deployment manner of the CU and the DU is relatively flexible. For example, CU parts of a plurality of base stations are integrated to form a relatively large-scale functional entity. FIG. 5 is a schematic diagram of a network architecture according to an embodiment of this application. As shown in FIG. 5, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented away from the baseband apparatus, or may be integrated into the baseband apparatus, or a part of the radio frequency apparatus is arranged away from the baseband apparatus and the other part of the radio frequency apparatus is integrated into the baseband apparatus. For example, in an LTE communications system, a RAN device (eNB) includes a baseband apparatus and a radio frequency apparatus, where the radio frequency apparatus may be arranged away from the baseband apparatus (for example, a remote radio unit (RRU) is arranged away from a baseband unit (BBU)). The RAN device is implemented by using a node, and the node is used to implement functions of protocol layers such as a radio resource control (RRC) layer, a packet data convergence protocol (PDCP) layer, a radio link control (RLC) layer, and a media access control (MAC) layer. For another example, in an evolved structure, the baseband apparatus may include a central unit (CU) and a distributed unit (DU), and a plurality of DUs may be controlled by one CU. As shown in FIG. 5, the CU and the DU may be divided based on a protocol layer of a wireless network. For example, functions of a PDCP layer and a layer above the PDCP layer are set on the CU, and functions of protocol layers below the PDCP layer, for example, the radio link control layer and the media access control layer, are set on the DU.

The division of the protocol layer is merely an example, and division may alternatively be performed at another protocol layer, for example, at an RLC layer. Functions of the RLC layer and layers above the RLC layer are set on the CU, and functions of protocol layers below the RLC layer are set on the DU. Alternatively, division is performed at a protocol layer. For example, some functions of the RLC layer and functions of protocol layers above the RLC layer are set on the CU, and remaining functions of the RLC layer and functions of the protocol layers below the RLC layer are set on the DU. In addition, division may alternatively be performed in another manner, for example, performed based on a latency. A function whose processing time needs to meet a latency requirement is set on the DU, and a function whose processing time does not need to meet the latency requirement is set on the CU.

In addition, the radio frequency apparatus may not be arranged in the DU and is arranged away from the DU, or may be integrated into the DU, or a part of the radio frequency apparatus is arranged away from the DU, and the other part is integrated into the DU. This is not limited herein.

Figure 6:
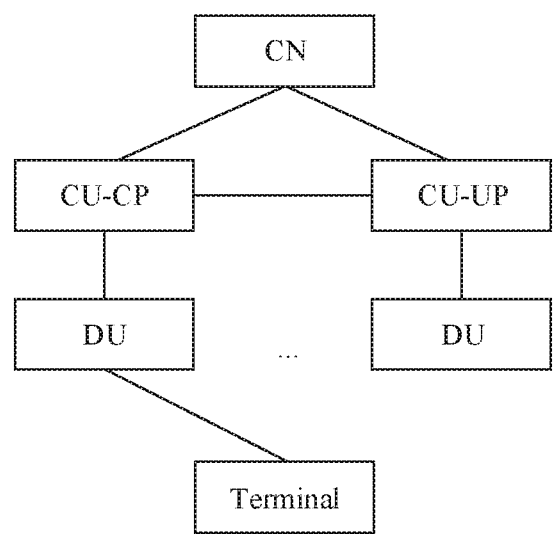
FIG. 6 is a schematic structural diagram of another base station according to this application.

In addition, referring to FIG. 6, compared with the architecture shown in FIG. 5, a control plane (CP) and a user plane (UP) of the CU may be separated and implemented by using different entities: a control plane CU entity (CU-CP entity) and a user plane CU entity (CU-UP entity).

In the foregoing network architecture, signaling/data generated by the CU may be sent to the terminal device by using the DU, or signaling/data generated by the terminal device may be sent to the CU by using the DU. The DU may not parse the signaling/data, but directly encapsulate the signaling/data by using a protocol layer and transparently transmits the signaling/data to the terminal device or the CU. In the following embodiment, if transmission of the signaling/data between the DU and the terminal device is described, sending or receiving the signaling/data by the DU is applicable to the foregoing scenario. For example, signaling/data of an RRC or a PDCP layer is finally processed as signaling/data of a physical layer (PHY) and sent to the terminal device, or is converted from received signaling/data of a PHY layer. In this architecture, the signaling/data of the RRC or PDCP layer may also be considered as being sent by the DU, or sent by the DU and a radio frequency apparatus.

In the foregoing embodiment, the CU is classified as a network device in the RAN. In addition, the CU may be alternatively classified as a network device in the CN. This is not limited herein.

The apparatus in the following embodiments of this application may be located in the terminal device or the network device based on a function implemented by the apparatus. When the foregoing CU-DU structure is used, the network device may be a CU node, a DU node, or a RAN device including the CU node and the DU node.

For example, the terminal device is a vehicle-mounted device. A vehicle-mounted device A supports the first transmission mode, and a vehicle-mounted device B supports the second transmission mode. The first transmission mode has a first transmission characteristic that is incompatible with the second transmission mode. For example, the first transmission characteristic is 64QAM. In this case, when a V2X message needs to be exchanged between the vehicle-mounted device A and the vehicle-mounted device B, because the vehicle-mounted device B is incompatible with the first transmission characteristic in the first transmission mode, the vehicle-mounted device B may not correctly parse the V2X message sent by the vehicle-mounted device A by using the first transmission characteristic. In addition, the vehicle-mounted device A may cause interference to the vehicle-mounted device B, thereby affecting communication quality of the vehicle-mounted device B.

Based on this, this application provides a service transmission method. In this solution, the terminal device first determines an association relationship between radio resource information and transmission characteristic information, where the transmission characteristic information may be used to determine the first transmission characteristic, and the radio resource information may be used to determine a transmission resource set used to transmit the V2X message. Therefore, the terminal device may determine, based on the association relationship between radio resource information and transmission characteristic information, a first transmission resource set supporting the first transmission characteristic. When determining to transmit obtained service data by using the first transmission characteristic, the terminal device may select a direct link transmission resource from the first transmission resource set supporting the first transmission characteristic to transmit the service data, and transmit the service data on the selected direct link transmission resource by using the first transmission characteristic. Because different transmission resource sets may be corresponding to different transmission characteristics, interference to another terminal device caused when the terminal device transmits, on different transmission resource sets, service data by using a transmission characteristic supported by the transmission resource set may be avoided, thereby improving communication quality.

Figure 7:
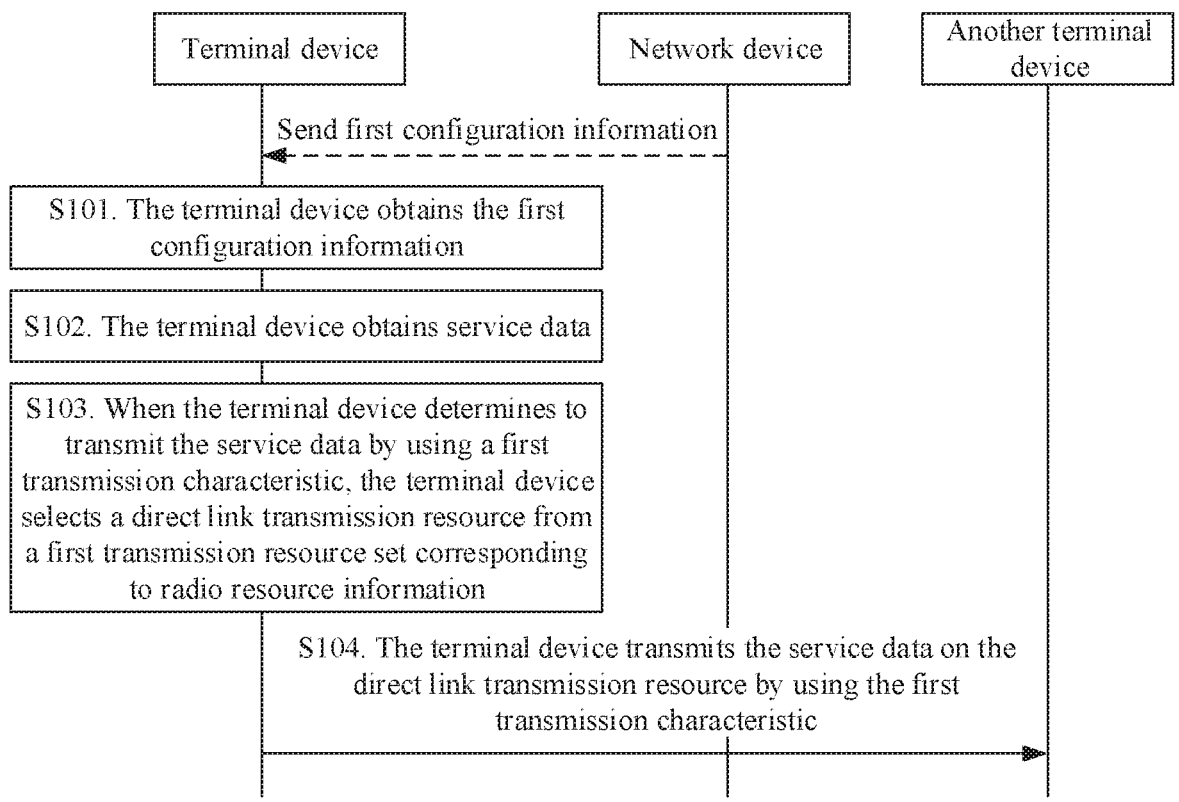
FIG. 7 is a schematic flowchart 1 of a service transmission method according to this application.

The following describes a procedure of the service transmission method provided in this application. As shown in FIG. 7, the procedure includes the following steps.

S101. A terminal device obtains first configuration information, where the first configuration information includes radio resource information and transmission characteristic information corresponding to the radio resource information.

Specifically, the terminal device in this application may be the terminal device shown in FIG. 4. This is not limited in this application.

For example, the radio resource information in this application may be a radio resource identifier.

The radio resource information is used to determine a transmission resource set supporting transmission of a V2X message.

For example, a first transmission characteristic in this application may be one or more transmission characteristics that are introduced in a first transmission mode and are incompatible with a second transmission mode.

For example, the second transmission mode in this application includes an original transmission characteristic in the second transmission mode and a transmission characteristic that is introduced in the first transmission mode and that is compatible with the second transmission mode. The original transmission characteristic in the second transmission mode may be a multi-carrier, using an MCS table that does not support 64QAM, and the like.

For example, the first transmission mode in this application includes a transmission characteristic that is introduced in the first transmission mode and that is incompatible with the second transmission mode.

For example, the transmission resource set in this application may be a time-frequency resource, or may be a frequency domain resource. For example, the frequency domain resource may be a transmission carrier frequency, for example, a carrier or a frequency, and the time-frequency resource may be a transmission resource pool.

Specifically, the radio resource information in this application may be one or more of a transmission carrier frequency identifier and a transmission resource pool identifier.

Figure 8:
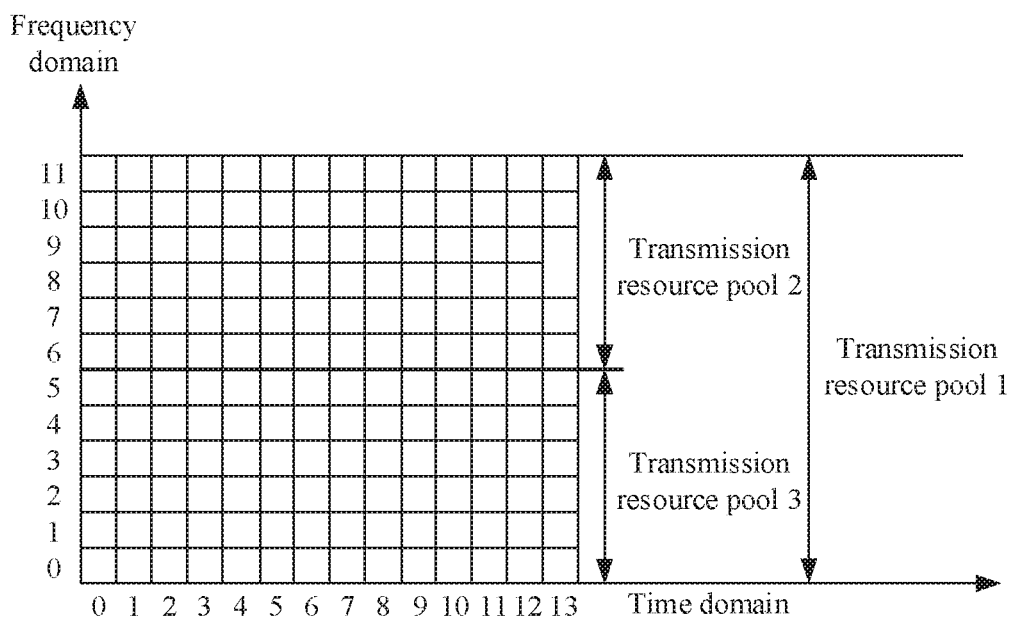
FIG. 8 is a schematic structural diagram of a time-frequency resource according to this application.

In an example, one transmission carrier frequency in this application may be configured with one transmission resource pool, for example, a transmission resource pool 1 shown in FIG. 8, and may alternatively be configured with two or more non-overlapping transmission resource pools (which may also be referred to as transmission resource pools without an intersection set), for example, a transmission resource pool 2 and a transmission resource pool 3 shown in FIG. 8. Each transmission resource pool may be corresponding to one transmission mode, in other words, the terminal device may determine one or more transmission characteristics included in a transmission mode corresponding to each transmission resource pool as transmission characteristics supported by each transmission resource pool.

The non-overlapping transmission resource pool in this application may be: any PRB/subframe may exist in at most one transmission resource pool, and a same PRB/subframe cannot exist in two or more transmission resource pools.

For example, a transmission mode corresponding to the transmission resource pool 1 may be the first transmission mode, and the first transmission mode may include a transmission characteristic 1 and a transmission characteristic 2. In this case, transmission characteristics supported by the transmission resource pool 1 are the transmission characteristic 1 and the transmission characteristic 2.

In addition, the terminal device may determine, based on transmission modes corresponding to transmission resource pools included in a transmission carrier frequency, a transmission mode corresponding to the transmission carrier frequency and a transmission characteristic supported by the transmission carrier frequency. When a transmission carrier frequency is configured with two or more transmission resource pools, and the two or more transmission resource pools are corresponding to different transmission modes, the transmission carrier frequency may be corresponding to two or more transmission modes.

For example, if a transmission carrier frequency 1 is configured with the transmission resource pool 1, and the transmission mode corresponding to the transmission resource pool 1 is the first transmission mode, the terminal device determines that a transmission mode corresponding to the transmission carrier frequency 1 is the first transmission mode.

For example, the transmission carrier frequency 1 is configured with the transmission resource pool 1 and the transmission resource pool 2, where a transmission mode corresponding to the transmission resource pool 1 is the first transmission mode, and a transmission mode corresponding to the transmission resource pool 2 is the second transmission mode. In this case, the terminal device determines that the transmission mode corresponding to the transmission carrier frequency 1 is the first transmission mode and the second transmission mode.

The radio resource information in this application may be used by the terminal device to determine, from one or more radio resources (for example, the radio resource is a transmission carrier frequency or a transmission resource pool) configured by a network device, a radio resource corresponding to the radio resource information. Therefore, in an actual process, the network device may add one piece of indication information to configuration information of the one or more radio resources, and the indication information is used to indicate a transmission mode supported by the one or more radio resources. Therefore, the terminal device in this application may determine, based on the indication information included in the configuration information of the radio resource, a transmission mode supported by the radio resource, to determine a mapping relationship between radio resource information and transmission characteristic information.

In an example, the terminal device in this application may determine the mapping relationship between radio resource information and transmission characteristic information in a manner shown in S1011.

S1011. The terminal device determines, based on indication information included in configuration information of a radio resource indicated by the radio resource information, a transmission mode supported by the radio resource indicated by the radio resource information, and obtains first configuration information based on one or more transmission characteristics corresponding to the transmission mode supported by the radio resource.

The indication information may include a first indication and a second indication, where the first indication is used to indicate that the radio resource indicated by the radio resource information supports the first transmission mode, and the second indication is used to indicate that the radio resource indicated by the radio resource information supports the second transmission mode.

For example, the radio resource indicated by the radio resource information is a transmission carrier frequency. When the terminal device determines that configuration information of the transmission carrier frequency includes the first indication, the terminal device determines that the transmission carrier frequency supports the first transmission mode. When the terminal device determines that the configuration information of the transmission carrier frequency includes the second indication, the terminal device determines that the transmission carrier frequency supports the second transmission mode.

In this application, a size of the indication information may be determined by a quantity of transmission resource pools configured for one transmission carrier frequency. For example, when the radio resource is one transmission carrier frequency, the size of the indication information may be 1 bit.

For example, if the indication information in the configuration information of the radio resource is "0", it indicates that the transmission mode supported by the radio resource is the first transmission mode, or if the indication information in the configuration information of the radio resource is "1", it indicates that the transmission mode supported by the radio resource is the second transmission mode.

In addition, the terminal device may further negotiate with the network device about whether to add the indication information to the configuration information of the radio resource, and a specific transmission mode supported by the radio resource when the indication information is added to the configuration information of the radio resource or when the indication information is not added to the configuration information of the radio resource.

In an example, when the terminal device and the network device determine, through negotiation, to add the indication information to the configuration information, the transmission mode supported by the radio resource is the first transmission mode, or when the terminal device and the network device determine, through negotiation, not to add the indication information to the configuration information, the transmission mode supported by the radio resource is the second transmission mode.

For example, when the terminal device determines that the configuration information of the radio resource indicated by the radio resource information includes the indication information, the terminal device determines that the radio resource indicated by the radio resource information supports the first transmission mode. When the terminal device determines that the configuration information of the radio resource indicated by the radio resource information does not include the indication information, the terminal device determines that the radio resource indicated by the radio resource information supports the second transmission mode.

In another example, when the terminal device and the network device determine, through negotiation, to add the indication information to the configuration information, the transmission mode supported by the radio resource is the second transmission mode, or when the terminal device and the network device determine, through negotiation, not to add the indication information to the configuration information, the transmission mode supported by the radio resource is the first transmission mode.

The foregoing describes how to determine the transmission mode supported by the radio resource, and it may be understood that after determining the transmission mode supported by the radio resource, the terminal device may establish a mapping relationship between the radio resource information and one or more transmission characteristics included in the transmission mode supported by the radio resource.

For example, in this application, the terminal device may obtain the configuration information of the radio resource in the following manners. For example, the terminal device obtains the configuration information of the radio resource by pre-storing information, or from a system message broadcast by the network device, or from a message sent by the network device by using dedicated radio resource control (RRC) signaling.

In addition, in this application, the terminal device may determine, based on the configuration information sent by the network device, whether one carrier frequency is configured with two or more transmission resource pools, a location of each of the two or more transmission resource pools, and a transmission mode supported by each of the two or more transmission resource pools. In addition, the terminal device in this application may further determine, in the following manner, transmission resource pools included in one transmission carrier frequency.

The network device may send configuration information of two or more transmission carrier frequency sets to the terminal device, all transmission carrier frequencies included in the two or more transmission carrier frequency sets are transmission carrier frequencies supported by the terminal device, configuration information of each of the two or more transmission carrier frequency sets is used to determine a transmission mode supported by the transmission carrier frequency set, and different transmission carrier frequency sets support different transmission modes.

When the terminal device determines, based on the configuration information of the two or more transmission carrier frequency sets, that an overlapping transmission carrier frequency exists in any two transmission carrier frequency sets in the two or more transmission carrier frequency sets, the terminal device determines that the overlapping transmission carrier frequency may be corresponding to two or more transmission modes. Therefore, the terminal device may divide the overlapping transmission carrier frequency into several transmission resource pools, so that each transmission resource pool is corresponding to one transmission mode.

In this application, that an overlapping transmission carrier frequency exists in any two transmission carrier frequency sets means that one transmission carrier frequency exists in two or more transmission resource sets.

For example, the terminal device determines that a transmission carrier frequency set 1 supports the first transmission mode, the transmission carrier frequency set 2 supports the second transmission mode, and an overlapping transmission carrier frequency, for example, a transmission carrier frequency 3, exists between the transmission carrier frequency set 1 and the transmission carrier frequency set 2. In this case, the transmission carrier frequency 3 supports both the first transmission mode and the second transmission mode, and therefore, the terminal device may divide the transmission carrier frequency 3 into two non-overlapping transmission resource pools.

For example, the terminal device uses a carrier part, supporting the first transmission mode, of the transmission carrier frequency 3 as one transmission resource pool, and uses a carrier part, supporting the second transmission mode, of the transmission carrier frequency 3 as the other transmission resource pool, to determine two transmission resource pools included in the transmission carrier frequency 3.

It should be noted that when one transmission carrier frequency supports two or more transmission modes, a 2-bit field may be used in configuration information of the transmission carrier frequency to indicate a transmission mode supported by the transmission carrier frequency.

For example, "00" is used to indicate that the transmission carrier frequency supports the second transmission mode, "01" is used to indicate that the transmission carrier frequency supports the first transmission mode, and "11" is used to indicate that the transmission carrier frequency supports both the second transmission mode and the first transmission mode.

The first transmission characteristic may be a transmission characteristic that is introduced in the first transmission mode and that is incompatible with the second transmission mode. Therefore, different first transmission characteristics may have different types of transmission characteristic information, and details are described as follows.

In an example, the first transmission characteristic is 64QAM. The transmission characteristic information corresponding to the first transmission characteristic may include one or more types of the following information: first indication information, where the first indication information is used to indicate that 64QAM is supported; first MCS configuration information, where the first MCS configuration information includes configuration information of supporting 64QAM; or second MCS configuration information, where the second MCS configuration information includes one or more of a first minimum MCS index and a first maximum MCS index that are used by the terminal device, and a determined MCS index range of the one or more of the first minimum MCS index and the first maximum MCS index in a first MCS index table includes an MCS index of supporting 64QAM.

In another example, the first transmission characteristic is transmit diversity, and transmission characteristic information corresponding to the first transmission characteristic may include one or more types of the following information:
  second indication information, where the second indication information is used to indicate that the transmit diversity is supported; or transmit diversity configuration information, where the transmit diversity configuration information includes one or more of an identifier of a quantity of antenna ports, a codebook subset constraint identifier, a transmit antenna selection identifier, an identifier of a maximum quantity of layers, or an optional codebook enabler identifier.

In still another example, the first transmission characteristic is using a second MCS index table. The transmission characteristic information corresponding to the first transmission characteristic includes one or more of a second minimum MCS index and a second maximum MCS index that are used by the terminal device, where the second MCS index table is an MCS index table of supporting 64QAM on a direct link transmission resource. In this case, step S104 may be specifically implemented in the following manner: The terminal device selects a first MCS for service data in the second MCS index table based on the second minimum MCS index and/or the second maximum MCS index; and the terminal device transmits the service data on the direct link transmission resource by using the first MCS, and adds the second MCS index table indication information and an index corresponding to the first MCS to corresponding direct link control information.

The second minimum MCS index herein represents a lower limit of all MCS indexes included in the second MCS table, and the second minimum MCS index represents an upper limit of all the MCS indexes included in the second MCS table, where an index table determined based on the second minimum index and the second maximum index in the second MCS table supports 64QAM and other MCS manners.

Another example: S1012. The terminal device may obtain first configuration information from a sending apparatus (for example, the network device shown in FIG. 4 or a chip applied to the network device) that communicates with the terminal device, where the first configuration information includes the mapping relationship between radio resource information and transmission characteristic information.

For example, in this application, the terminal device may obtain the first configuration information in the following manners: obtaining the first configuration information by pre-storing information or from dedicated signaling (for example, RRC signaling) sent by the network device to the terminal device, or obtaining the first configuration information from system information broadcast by the network device, or the terminal device obtains the first configuration information by using an upper layer of the terminal device, or the terminal device may also obtain the first configuration information from pre-stored information. This is not limited in this application.

The upper layer of the terminal device in this application is relative to a current protocol layer. In this application, the upper layer of the terminal device is mainly an upper layer of an access layer and may be an application layer, an adaptation layer, or the like of the upper layer.

S102. The terminal device obtains service data.

For example, in this application, the access layer of the terminal device may obtain the service data from the upper layer of the terminal device.

S103. When the terminal device determines to transmit the service data by using a first transmission characteristic, the terminal device selects a direct link transmission resource from a first transmission resource set corresponding to the radio resource information. The first transmission characteristic is a transmission characteristic supported by the transmission characteristic information.

For example, when the first transmission resource set includes a plurality of direct link transmission resources, the terminal device may randomly select one direct link transmission resource from the plurality of direct link transmission resources to transmit the service data. This is not limited in this application.

S104. The terminal device transmits the service data on the direct link transmission resource by using the first transmission characteristic.

For example, the terminal device may transmit the service data to another terminal device.

In the service transmission method provided in this application, the terminal device first determines an association relationship between radio resource information and transmission characteristic information, where the transmission characteristic information may be used to determine the first transmission characteristic, and the radio resource information may be used to determine the transmission resource set. Therefore, the terminal device may determine, based on the association relationship between radio resource information and transmission characteristic information, the first transmission resource set supporting the first transmission characteristic. When determining to transmit obtained service data by using the first transmission characteristic, the terminal device may select a direct link transmission resource from the first transmission resource set supporting the first transmission characteristic to transmit the service data, and transmit the service data on the selected direct link transmission resource by using the first transmission characteristic. Because different transmission resource sets may be corresponding to different transmission characteristics, interference to another terminal device caused when the terminal device transmits, on different transmission resource sets, the service data by using the transmission characteristic supported by the transmission resource set can be avoided, thereby resolving problems of communication compatibility and coexistence between terminal devices that use different transmission characteristics and operate in different transmission modes.

Figure 9:
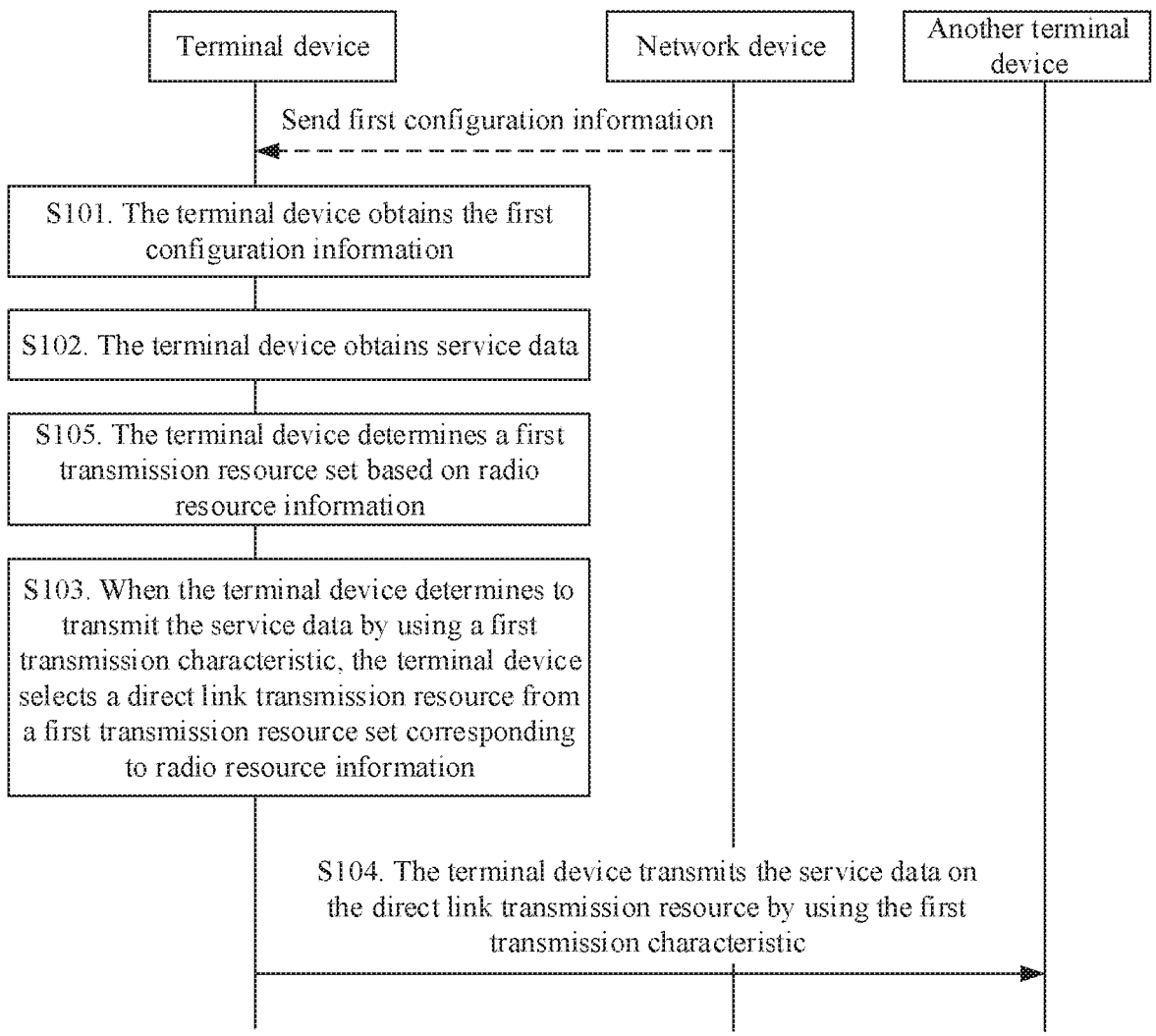
FIG. 9 is a schematic flowchart 2 of a service transmission method according to this application.

For example, in another embodiment of this application, as shown in FIG. 9, before step S103 provided in this application, the method further includes the following steps.

S105. The terminal device determines a first transmission resource set based on the radio resource information, where the first transmission resource set supports the first transmission characteristic.

One transmission carrier frequency may be configured with one transmission resource pool, or may be configured with two or more transmission resource pools. Therefore, the radio resource information in this application may be used to determine a transmission resource pool identifier, or may be used to determine a transmission carrier frequency identifier. The following separately describes specific content of the first transmission resource set based on different radio resource information.

Case 1: The network device configures all of one or more transmission resource pools on the transmission carrier frequency to the terminal device. Case 2: The network device configures a part of the one or more transmission resource pools on the transmission carrier frequency to the terminal device, and configures the other part of the one or more transmission resource pools to another terminal device.

For example, based on the case 1, in an example of this application, that the terminal device determines a first transmission resource set based on the radio resource information may be implemented in the following manners.

S1051. The terminal device determines, based on a first transmission carrier frequency identifier, all available direct link transmission resources on a first transmission carrier frequency corresponding to the first transmission carrier frequency identifier.

For example, in this application, the first transmission carrier frequency identifier is used by the terminal device to determine a first transmission carrier frequency from one or more transmission carrier frequencies configured by the network device for the terminal device.

S1052. The terminal device determines all the available direct link transmission resources of the first transmission carrier frequency as the first transmission resource set.

For example, if the first transmission carrier frequency corresponding to the first transmission carrier frequency identifier is a carrier 1, and the carrier 1 includes N direct link transmission resources, the terminal device may determine that the first transmission resource set is the N direct link transmission resources included in the carrier 1, where N is a positive integer.

For example, the first transmission carrier frequency is a carrier 1. The carrier 1 includes a transmission resource pool 1, a transmission resource pool 2, and a transmission resource pool 3, where the transmission resource pool 1, the transmission resource pool 2, and the transmission resource pool 3 are all transmission resource pools that are configured by the network device for the terminal device and that may be used by the terminal device. Available direct link transmission resources of the terminal device in the transmission resource pool 1 are a direct link transmission resource 1 and a direct link transmission resource 2, available direct link transmission resources in the transmission resource pool 2 are a direct link transmission resource 3, a direct link transmission resource 4, and a direct link transmission resource 5, and available direct link transmission resources in the transmission resource pool 3 are a direct link transmission resource 6, a direct link transmission resource 7, and a direct link transmission resource 8. Therefore, the terminal device determines that the first transmission resource set is from the direct link transmission resource 1 to the direct link transmission resource 8.

Based on the case 2, in another example of this application, that the terminal device determines a first transmission resource set based on the radio resource information may be implemented in the following manners.

S1053. The terminal device determines, based on the first transmission carrier frequency identifier, a transmission resource pool used by the terminal device on the first transmission carrier frequency corresponding to the first transmission carrier frequency identifier.

For example, the first transmission carrier frequency identifier is used by the terminal device to determine, from one or more transmission carrier frequencies configured by the network device, a first transmission carrier frequency allocated to the terminal device.

S1054. The terminal device determines all available direct link transmission resources on the used transmission resource pool as the first transmission resource set.

For example, the first transmission carrier frequency is a carrier 1, and the carrier 1 includes a transmission resource pool 1, a transmission resource pool 2, a transmission resource pool 3, and a transmission resource pool 4, where the transmission resource pool 1 and the transmission resource pool 2 are configured by the network device for another terminal device, the transmission resource pool 3 and the transmission resource pool 4 are configured by the network device for the terminal device, the transmission resource pool 3 is a transmission resource pool used by the terminal device, and all available direct link transmission resources in the transmission resource pool 3 are the direct link transmission resource 1, the direct link transmission resource 2, and the direct link transmission resource 3. In this case, the terminal device determines that the first transmission resource set is the direct link transmission resource 1, the direct link transmission resource 2, and the direct link transmission resource 3.

It should be noted that, for example, the first transmission carrier frequency is a carrier, when one carrier is configured with two or more non-overlapping transmission resource pools, each of the two or more transmission resource pools may be mapped to a same transmission mode, or may be mapped to different transmission modes. Therefore, one or more transmission characteristics included in a transmission mode/transmission modes to which each transmission resource pool is mapped may be determined as one or more transmission characteristics respectively supported by each transmission resource pool.

For example, a transmission mode corresponding to the two or more non-overlapping transmission resource pools in this application is a transmission mode supported by a carrier on which the two or more non-overlapping transmission resource pools are located.

The following uses an example in which the two or more transmission resource pools are mapped to different transmission modes, and the two or more transmission resource pools on the carrier 1 include a Pool A and a Pool B, where the Pool A is corresponding to the second transmission mode, and the Pool B is corresponding to the first transmission mode. Therefore, the carrier 1 supports the second transmission mode and the first transmission mode.

In addition, the N direct link transmission resources included in the carrier 1 are equal to a sum of M1 direct link transmission resources included in the transmission resource pool 1 and all direct link transmission resources included in the transmission resource pool 2.

In another example, when the radio resource information is the first transmission resource pool identifier, that the terminal device determines a first transmission resource set based on the radio resource information may be implemented in the following manners.

S1055. The terminal device determines, on the first transmission carrier frequency based on the first transmission resource pool identifier, a transmission resource pool corresponding to the first transmission resource pool identifier.

It may be understood that the first transmission carrier frequency herein is a transmission carrier frequency that can be used by the terminal device.

S1056. The terminal device determines all available direct link transmission resources on the transmission resource pool corresponding to the first transmission resource pool identifier as the first transmission resource set.

For example, the first transmission resource pool identifier may be used by the terminal device to determine, from one or more transmission resource pools configured by the network device for the terminal device, the transmission resource pool corresponding to the first transmission resource pool identifier.

In this application, the terminal device may determine to transmit the service data by using the first transmission characteristic in the following manners.

Figure 10:
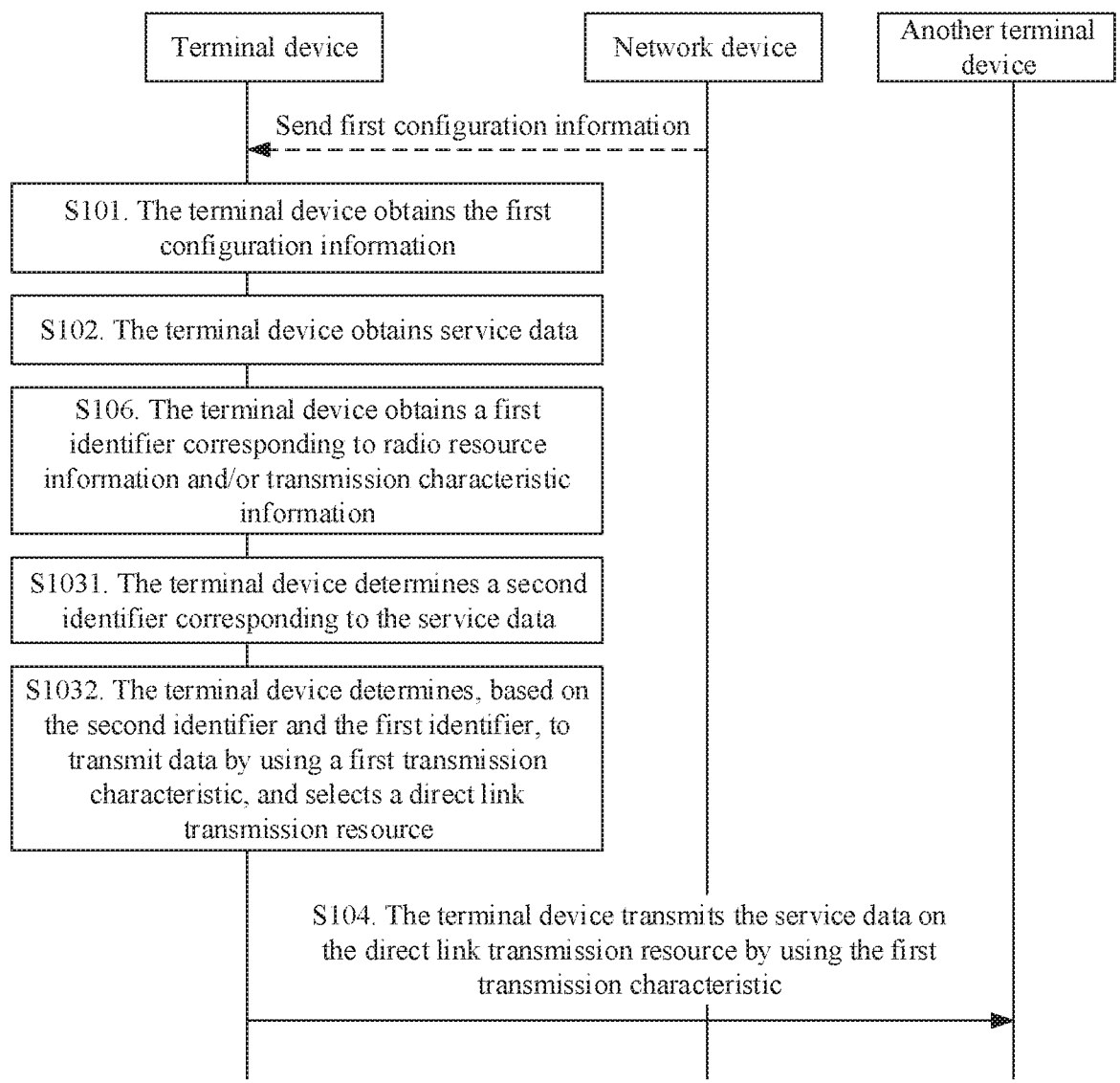
FIG. 10 is a schematic flowchart 3 of a service transmission method according to this application.

As shown in FIG. 10, in another embodiment of this application, the method provided in this application further includes the following steps.

S106. The terminal device obtains a first identifier corresponding to the radio resource information and/or the transmission characteristic information, where the first identifier is corresponding to a parameter value/parameter values of one or more first parameters of the service data, and the one or more first parameters include one or more of a service type identifier, a PPPP identifier, a quality of service (QoS) identifier, a reliability identifier, a bearer identifier, a delay identifier, a speed identifier of the terminal device, or a transmission rate identifier.

For example, the terminal device may establish a mapping relationship between a service type identifier and a transmission mode or one or more transmission characteristics supported by the transmission mode, or establish a mapping relationship between a PPPP identifier and a transmission mode or one or more transmission characteristics supported by the transmission mode, or establish a mapping relationship between a reliability identifier and a transmission mode or one or more transmission characteristics supported by the transmission mode, or the like, to obtain the first identifier corresponding to the radio resource information and/or the transmission characteristic information.

For example, any one of a parameter value of the quality of service QoS identifier, a parameter value of the reliability identifier, a parameter value of the bearer identifier, a parameter value of the delay identifier, or a parameter value of the transmission rate identifier may be corresponding to a specified value, or may be corresponding to a range value that has an upper limit and a lower limit. This is not limited in this application.

For example, the parameter value of the quality of service QoS identifier is corresponding to a parameter value of first quality of service, or the quality of service QoS identifier indicates parameter values between the parameter value of the first quality of service and a parameter value of second quality of service.

For example, the parameter value of the first quality of service corresponding to the quality of service QoS identifier is 5, or the parameter values between the parameter value of the first quality of service and the parameter value of the second quality of service that are corresponding to the quality of service QoS identifier are [5, 10]. The reliability identifier is corresponding to a parameter value of first reliability, or the reliability identifier is corresponding to parameter values between the parameter value of the first reliability and a parameter value of second reliability. For example, the parameter value of the first reliability corresponding to the reliability identifier is 0.8, or the parameter values between the parameter value of the first reliability and the parameter value of the second reliability that are corresponding to the reliability identifier are corresponding to [0.2, 0.5].

Based on step S106, in an example of this application, that the terminal device determines to transmit the service data by using a first transmission characteristic may be implemented in step S1031.

S1031. The terminal device determines a second identifier corresponding to the service data, where the second identifier is corresponding to a parameter value/parameter values of one or more first parameters of the service data.

In this application, the second identifier corresponding to the service data may be obtained by the terminal device from an upper layer of the terminal device, or may be obtained by the terminal device by using a network configuration, or may be obtained by using pre-stored information. This is not limited in this application.

S1032. When the terminal device determines that a parameter value of a first parameter corresponding to the second identifier is the same as a parameter value of a first parameter corresponding to the first identifier, the terminal device determines to transmit the service data by using the first transmission characteristic.

In an example, in this application, that a parameter value of a first parameter corresponding to the second identifier is the same as a parameter value of a first parameter corresponding to the first identifier may be understood as follows: 1. When an identifier/identifiers of one or more first parameters corresponding to the first identifier is/are a specified value/specified values or a range value/range values, a parameter value/parameter values of one or more parameters corresponding to the second identifier is/are the same as a parameter value/parameter values of one or more parameters corresponding to the first identifier, 2. When the identifier/identifiers of the one or more first parameters corresponding to the first identifier is/are a range value/range values, the parameter value/parameter values of the one or more parameters corresponding to the second identifier is/are within a range of the parameter value/parameter values of the one or more parameters corresponding to the first identifier.

For example, when the first identifier includes a parameter A, the second identifier also includes a parameter A that is the same as that of the first identifier, and a value of the parameter A included in the first identifier is the same as a value of the parameter A included in the second identifier, the second identifier is determined as the first identifier.

For example, if the first identifier includes three parameters, the second identifier also need to include three parameters that are the same as those of the first identifier, and values of the three parameters of the first identifier are respectively the same as those of the second identifier, and in this case, the first identifier may be determined the same as the second identifier.

For example, the first parameter corresponding to the first identifier is a QoS identifier, and a parameter value of the QoS identifier is 5. When the terminal device determines that the parameter value of the QoS identifier corresponding to the second identifier that is corresponding to the service data is 5, the terminal device determines to transmit the service data by using the first transmission characteristic.

For example, the first parameter corresponding to the first identifier is a reliability identifier, and a parameter value of the reliability identifier is [0.2, 0.5]. When a parameter value of a reliability identifier corresponding to the second identifier is 0.3, the terminal device determines to transmit the service data by using the first transmission characteristic.

For example, the first parameter corresponding to the first identifier is a QoS identifier and a reliability identifier, a parameter value of the QoS identifier is 5, and a parameter value of the reliability identifier is [0.2, 0.5]. When the parameter value of the QoS identifier corresponding to the second identifier is 5, and the parameter value of the reliability identifier is 0.3, the terminal device determines to transmit the service data by using the first transmission characteristic.

In another example, in this application, when a parameter value of any one of the one or more first parameters corresponding to the second identifier is the same as a parameter value of a first parameter in the one or more first parameters corresponding to the first identifier, the parameter value of the first parameter corresponding to the second identifier is determined to be the same as the parameter value of the first parameter corresponding to the first identifier.

For example, the first parameter corresponding to the first identifier is a QoS identifier and a reliability identifier, a parameter value of the QoS identifier is 5, and a parameter value of the reliability is [0.2, 0.5]. When the first parameter corresponding to the second identifier is the reliability identifier, and a parameter value of the reliability identifier corresponding to the second identifier is 0.4, the terminal device determines to transmit the service data by using the first transmission characteristic.

Figure 11:
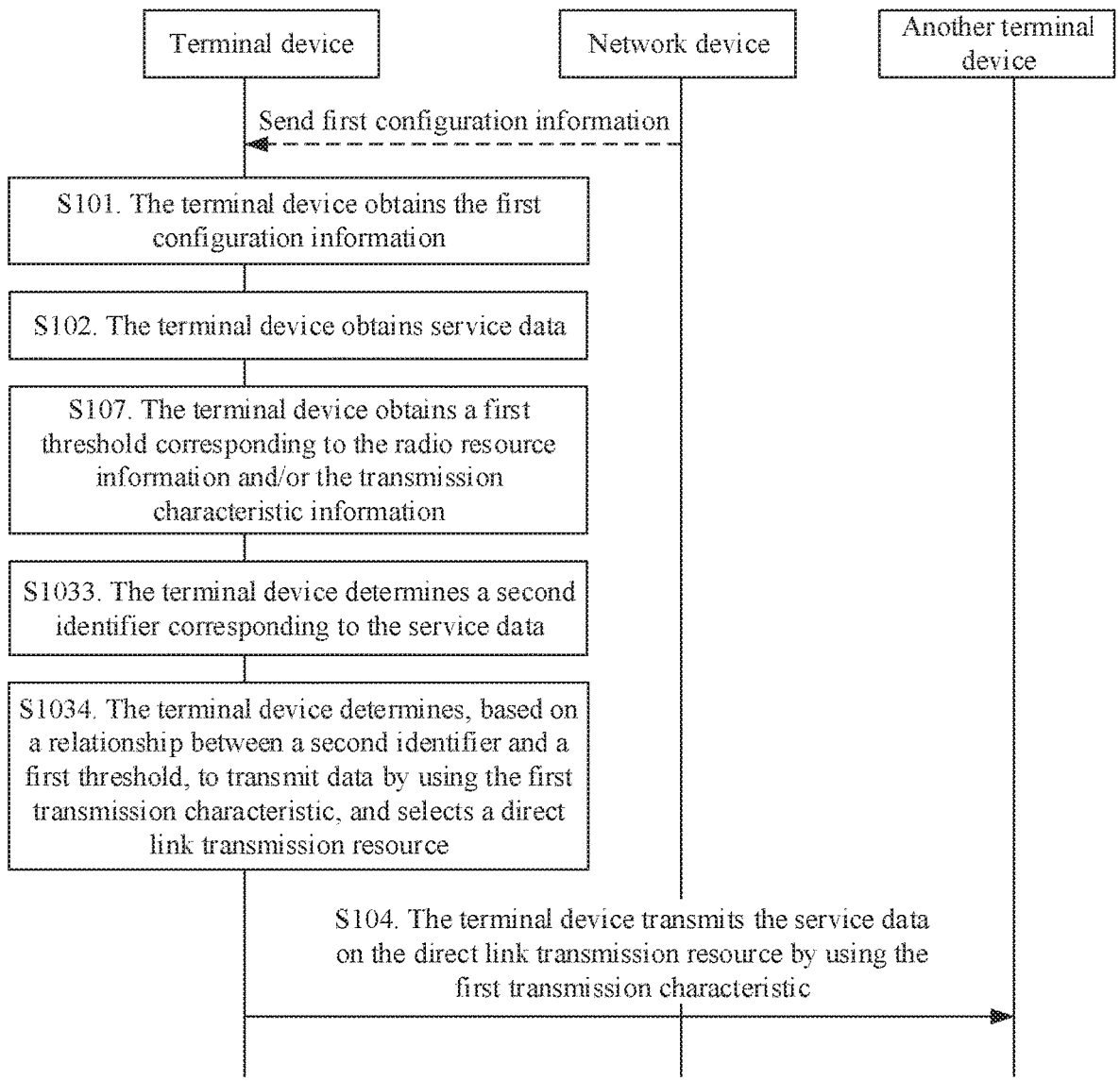
FIG. 11 is a schematic flowchart 4 of a service transmission method according to this application.

As shown in FIG. 11, in another embodiment of this application, the method provided in this application further includes the following steps.

S107. The terminal device obtains a first threshold corresponding to the radio resource information and/or the transmission characteristic information, where the first threshold is corresponding to a threshold/thresholds of one or more first parameters of the service data, and the one or more first parameters include one or more of a service type identifier, a proximity service per-packet priority PPPP identifier, a quality of service QoS identifier, a reliability identifier, a bearer identifier, a delay identifier, a speed identifier of the terminal device, or a transmission rate identifier.

For example, the terminal device may establish a mapping relationship between radio resource information and/or transmission characteristic information and a first threshold corresponding to the one or more first parameters, to obtain the first threshold corresponding to the radio resource information and/or the transmission characteristic information.

Correspondingly, in another example of this application, that the terminal device determines to transmit the service data by using a first transmission characteristic may be implemented in the following manners.

S1033. The terminal device determines a second identifier corresponding to the service data, where the second identifier is corresponding to a parameter value/parameter values of one or more first parameters of the service data.

Specifically, for a manner of obtaining the second identifier by the terminal device, refer to description in the foregoing embodiment. Details are not described herein again in this application.

S1034. The terminal device determines, based on a relationship between a first threshold and a parameter value of any one of the one or more first parameters corresponding to the second identifier, to transmit the service data by using the first transmission characteristic.

For example, step S1034 in this application may be implemented in the following manner. In an example, when the terminal device determines that a parameter value of any of the one or more first parameters corresponding to the second identifier is less than or equal to the first threshold, the terminal device determines to transmit the service data by using the first transmission characteristic.

Alternatively, in another example, when the terminal device determines that a parameter value of any one of the one or more first parameters corresponding to the service data is greater than or equal to the first threshold, the terminal device determines to transmit the service data by using the first transmission characteristic.

Figure 12:
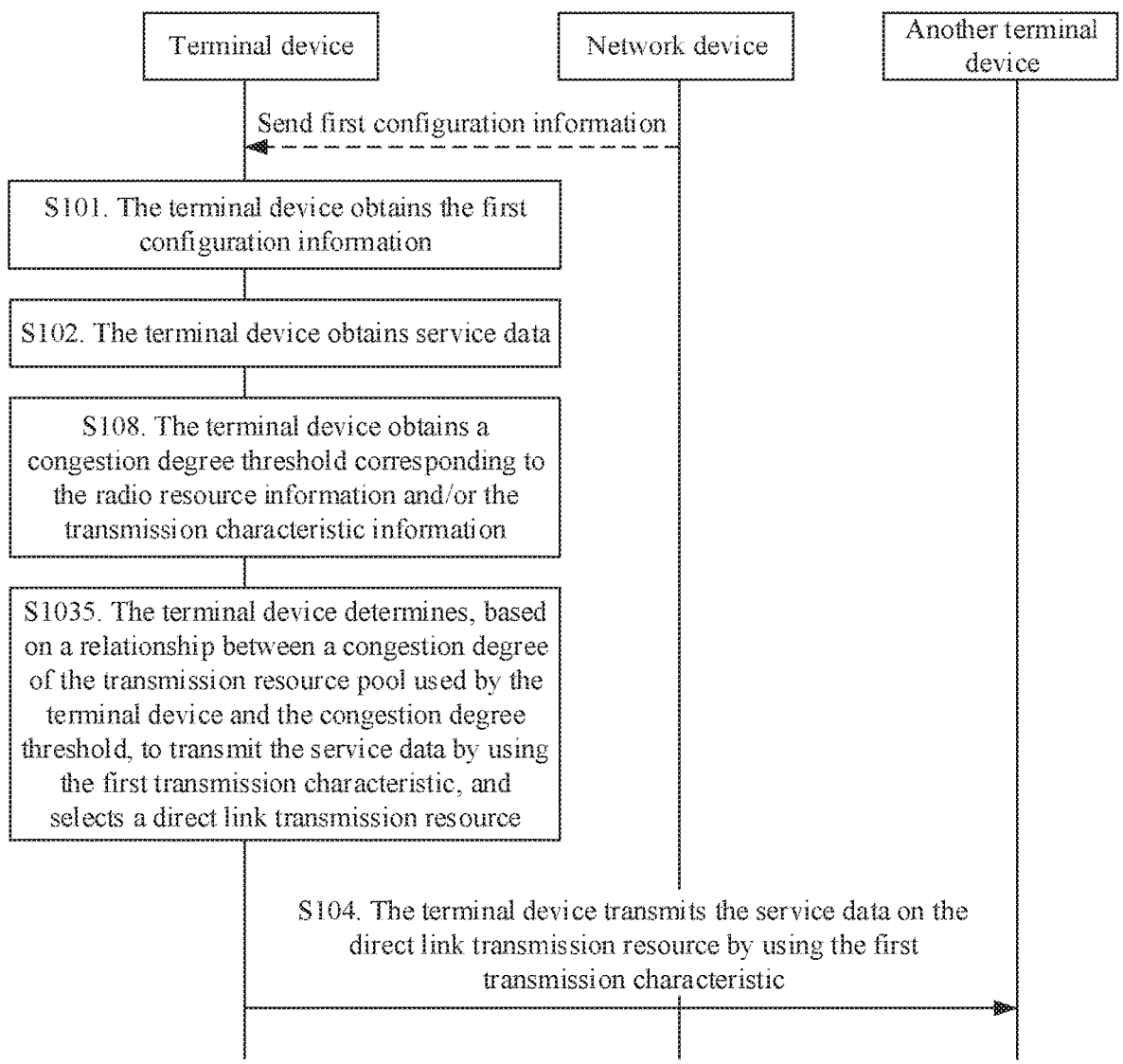
FIG. 12 is a schematic flowchart 5 of a service transmission method according to this application.

As shown in FIG. 12, in still another possible embodiment of this application, the method provided in this application further includes the following steps.

S108. The terminal device obtains a congestion degree threshold corresponding to the radio resource information and/or the transmission characteristic information.

A congestion degree in this application may be a channel busy ratio (CBR) corresponding to a transmission resource pool used by the terminal device or a currently used transmission carrier frequency, and may be represented by signal strength, for example, represented by using a reference signal received power (RSRP) and a received signal strength indicator (RSSI), namely, signal strength measured by the terminal device in the used transmission resource pool or on the used transmission carrier frequency.

Based on step S108, in yet another example of this application, the terminal device determines to transmit the service data by using a first transmission characteristic may be implemented in step S1035 or step S1036.

S1035. The terminal device determines, based on a relationship between a congestion degree of the transmission resource pool used by the terminal device and the congestion degree threshold, to transmit the service data by using the first transmission characteristic.

For example, step S1035 may be implemented in the following manners. When the terminal device determines that the congestion degree of the used transmission resource pool is less than or equal to the congestion degree threshold, the terminal device determines to transmit the service data by using the first transmission characteristic; or when the terminal device determines that the congestion degree of the used transmission resource pool is greater than or equal to the congestion degree threshold, the terminal device determines to transmit the service data by using the first transmission characteristic.

S1036. The terminal device determines, based on a relationship between a congestion degree of a transmission carrier frequency used by the terminal device and the congestion degree threshold, to transmit the service data by using the first transmission characteristic.

For example, step S1036 may be implemented in the following manners. When the terminal device determines that the congestion degree of the used transmission carrier frequency is less than or equal to the congestion degree threshold, the terminal device determines to transmit the service data by using the first transmission characteristic; or when the terminal device determines that the congestion degree of the used transmission carrier frequency is greater than or equal to the congestion degree threshold, the terminal device determines to transmit the service data by using the first transmission characteristic.

In this application, the transmission resource pool or the transmission carrier frequency used by the terminal device may be a transmission resource pool or a transmission carrier frequency corresponding to the service data, or may be a transmission resource pool or a transmission carrier frequency used to transmit the service data.

Figure 13:
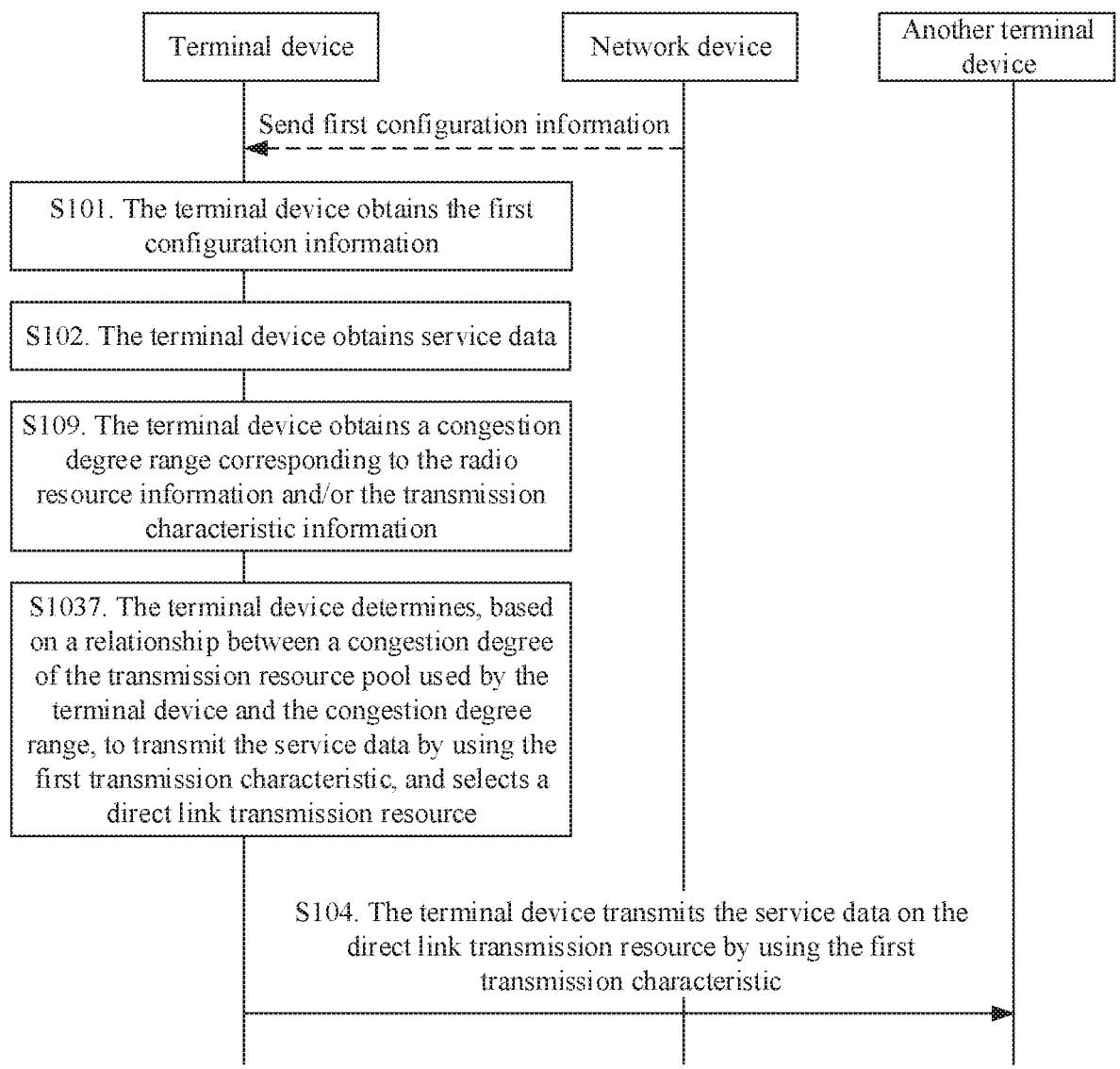
FIG. 13 is a schematic flowchart 6 of a service transmission method according to this application.

In yet another embodiment of this application, as shown in FIG. 13, the method provided in this application further includes the following steps.

S109. The terminal device obtains a congestion degree range corresponding to the radio resource information and/or the transmission characteristic information.

Based on step S109, in yet another example, in this application, that the terminal device determines to transmit the service data by using a first transmission characteristic may be implemented in S1037 or S1038.

S1037. The terminal device determines, based on a relationship between a congestion degree of the transmission resource pool used by the terminal device and the congestion degree range, to transmit the service data by using the first transmission characteristic.

For example, step S1037 in this application may be implemented in the following manner. When the terminal device determines that the congestion degree of the used transmission resource pool is within the congestion degree range, the terminal device determines to transmit the service data by using the first transmission characteristic.

S1038. The terminal device determines, based on a relationship between a congestion degree of a transmission carrier frequency used by the terminal device and the congestion degree range, to transmit the service data by using the first transmission characteristic.

For example, step S1038 in this application may be implemented in the following manner. When the terminal device determines that the congestion degree of the used transmission carrier frequency is within the congestion degree range, the terminal device determines to transmit the service data by using the first transmission characteristic.

In yet another possible embodiment of this application, the method provided in this application further includes the following steps.

S110. The terminal device obtains a channel load threshold corresponding to the radio resource information and/or the transmission characteristic information.

A channel load may be a channel bit rate (CBR), a reference signal received power (RSRP), or a received signal strength indicator (RSSI).

In still another example, based on step S110, in this application, that the terminal device determines to transmit the service data by using a first transmission characteristic may be implemented in the following steps.

S1039. The terminal device determines, based on a mapping relationship between a channel load and a channel load threshold, to transmit the service data by using the first transmission characteristic.

For example, in this application, a mapping relationship between a channel load used to transmit the service data and a transmission mode may be established, and a transmission mode that is used to transmit the service data may be determined based on the mapping relationship between a channel load and a channel load threshold.

For example, step S1039 in this application may be implemented in the following manner. When determining that the channel load is greater than or equal to the channel load threshold, the terminal device determines to transmit the service data by using the first transmission characteristic. Alternatively, when determining that the channel load for transmitting the service data is less than or equal to the channel load threshold, the terminal device determines to transmit the service data by using the first transmission characteristic.

It may be understood that the foregoing channel load threshold may be a channel load range. Therefore, when determining that the channel load for transmitting the service data is within a channel load threshold range the terminal device determines to transmit the service data by using the first transmission characteristic. In addition, in this application, the terminal device may further obtain a mapping relationship between a specified QoS flow or a specified QoS flow ID and radio resource information and/or transmission characteristic information. Therefore, when the terminal device determines that a QoS flow of the service data is the same as the specified QoS flow, or a QoS flow ID is the same as the specified QoS flow ID, the terminal device determines to transmit the service data by using the first transmission characteristic.

For example, in this application, the following manner may be used to indicate transmission characteristics that are used to transmit the service data.

For example, for that 64QAM is supported in the first transmission mode, one bit may be selected from reserved bits of control information (SA) of the service data as an indicator bit. When the bit is 1, it indicates that the service data needs to be transmitted by using 64QAM. Correspondingly, for another transmission characteristic, also refer to this method. One bit is used as an indicator, or one value of two or more bit fields is used as an indicator of a transmission characteristic. A specific implementation is not limited. In this way, the terminal device may identify, based on a corresponding indicator bit, transmission characteristics that are used to transmit the received service data.

Main content of the SA is information such as an MCS for information load, a start PRB, and an occupied PRB. Specifically, a receive end first blindly parses the SA, and after parsing out the SA, the receive end parses data content on a specified time-frequency resource based on the content of the SA and a specified MCS.

In addition, in still another embodiment of this application, the method provided in this application further includes: determining, by the terminal device based on whether a signal transmitted by using a transmission characteristic supported by the second transmission mode exists in the used transmission carrier frequency or the used transmission resource pool, whether to perform service transmission by using the first transmission characteristic.

For example, the determining, by the terminal device based on whether a signal transmitted by using a transmission characteristic supported by the second transmission mode exists in the transmission carrier frequency or the transmission resource pool used by the terminal device, whether to perform service transmission by using the first transmission characteristic may be implemented in the following step S111 or S112.

S111. When the terminal device learns of through measurement, before transmitting the service data, that a terminal device supporting the second transmission mode performs service transmission, or when a signal of the terminal device supporting the second transmission mode is greater than a first threshold, the terminal device determines not to transmit the service data by using the first transmission characteristic.

For example, the terminal device monitors the used transmission carrier frequency or the used transmission resource pool to receive and try to parse the received signal, and measures strength of the received signal. If the terminal device determines that the received signal is successfully parsed and the signal is transmitted by using the transmission characteristic supported by the second transmission mode, and the strength of the signal is greater than or equal to the first threshold, the terminal device does not trigger to transmit the service data by using the first transmission characteristic.

Alternatively, S112. When learning of through measurement, before transmitting the service data, a signal of the service data sent by the terminal device supporting the second transmission mode is less than the first threshold, or there is no signal of the service data sent by the terminal device supporting the second transmission mode, the terminal device transmits the service data by using the first transmission characteristic.

For example, when the terminal device fails to parse the signal in the used transmission carrier frequency or the used transmission resource pool, or successfully parses the signal, but the strength of the signal is less than or equal to the first threshold, the terminal device may transmit the service data by using the first transmission characteristic in the used transmission carrier frequency or the used transmission resource pool.

It should be noted that, in this application, a preconfigured transmission mode may be determined for the terminal device. When configuration information of the transmission resource pool does not explicitly indicate a transmission characteristic supported by the transmission resource pool, or configuration information of the transmission carrier frequency does not explicitly indicate a transmission characteristic supported by the transmission carrier frequency, or the supported transmission characteristic cannot be determined based on the foregoing characteristics (for example, the PPPP) of the service data, the channel congestion degree, and the like, or a transmission mode or a transmission characteristic supported by a service data flow is not configured, or there is no information such as a service characteristic or a channel congestion degree, the terminal device (a service flow of the terminal device) determines that the preconfigured transmission mode is the second transmission mode.

The foregoing mainly describes the solution provided in this embodiment of this application from a perspective of interaction between network elements. It may be understood that, each network element, such as the terminal device, includes a corresponding hardware structure and/or software module that is used to perform each function. A person of ordinary skill in the art should easily be aware that, in combination with the examples of units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, function module division may be performed on the terminal device based on the foregoing method embodiment, for example, function modules may be divided based on each function, or two or more functions may be integrated in one processing module. The integrated module may be implemented in a form of hardware, or may be implemented in a form of a software functional module. It should be noted that, in this embodiment of this application, module division is an example, and is merely a logical function division. In actual implementation, another division manner may be used. The following uses an example in which function modules are divided based on each function for description.

Figure 14:
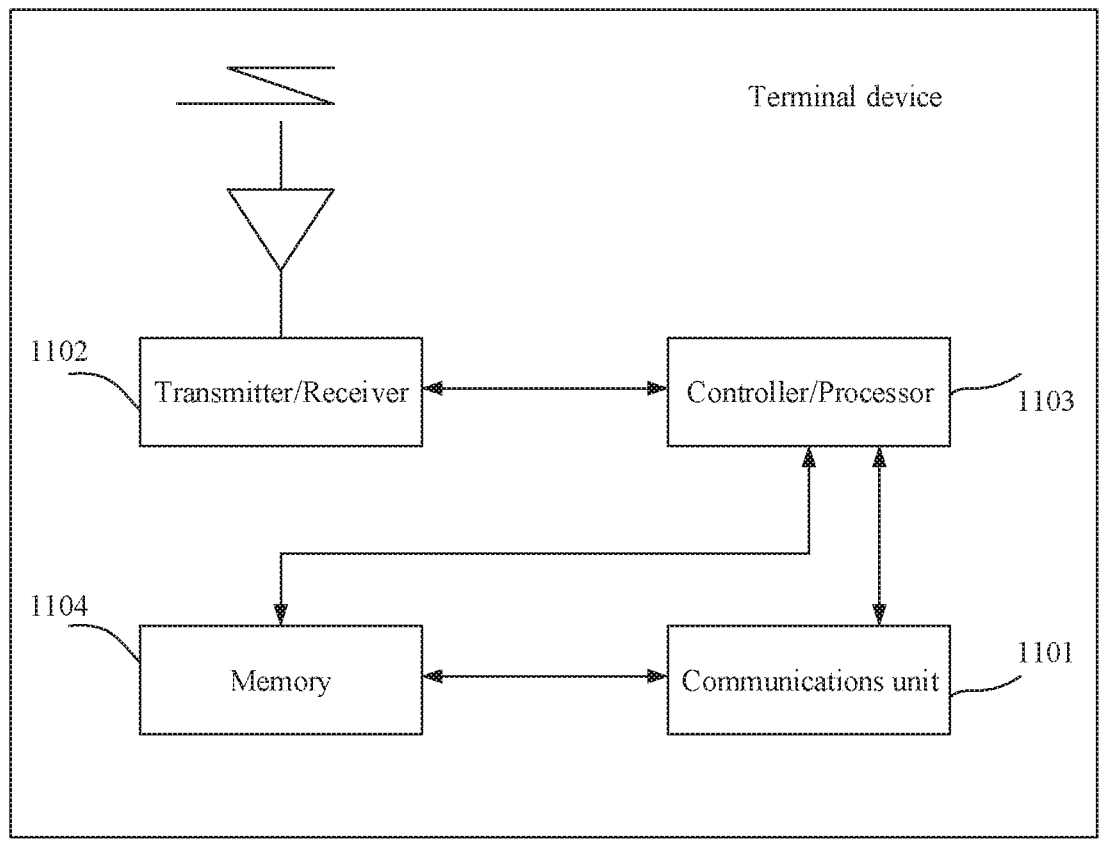
FIG. 14 is a schematic structural diagram of a terminal device according to this application.

In an example, the processing module is a processor or a controller, the sending module is a transmitter, and the receiving module is a receiver. FIG. 14 is a simplified schematic diagram of a possible design structure of the terminal device in the foregoing embodiment. The terminal device includes a transmitter/receiver 1102, a controller/processor 1103, a memory 1104, and a communications unit 1101.

The transmitter/receiver 1102 is configured to support transmitting and receiving information/data between the terminal device and another terminal device or a network device. In an example, the transmitter/receiver 1102 transmits service data on a direct link transmission resource by using the first transmission characteristic, and the service data is transmitted to the another terminal device in the foregoing embodiment by using an antenna. In downlink, the antenna receives signaling or data, for example, first configuration information, another configuration information, or service data, transmitted by the network device or the another terminal device in the foregoing embodiment. The transmitter/receiver 1102 adjusts (for example, performs filtering, amplifying, down-conversion, and digitizing on) the signaling or the data received from the antenna, and provides input sampling. These units perform processing based on a radio access technology (for example, an access technology of an LTE or another evolution system) used by a radio access network.

The controller/processor 1103 performs control management on actions of the terminal device, and is configured to perform processing that is performed by the terminal device in the foregoing embodiment, for example, configured to: when the terminal device determines to transmit the service data by using the first transmission characteristic, control the terminal device to select a direct link transmission resource from a first transmission resource set corresponding to the radio resource information and/or perform another process of the technology described in the present disclosure. In an example, the controller/processor 1103 is configured to support the terminal device in performing step S103 in FIG. 7, step S105 and step S103 in FIG. 9, S1031 and S1032 in FIG. 10, step S1033 and step S1304 in FIG. 11, step S1038 in FIG. 12, and step S1037 in FIG. 13. The memory 1104 is configured to store program code and data that are of the terminal device.

The transmitter/receiver 1102 is configured to support the terminal device in receiving data/signaling sent by another terminal device or the network device. In an example, the transmitter/receiver 1102 is configured to support the terminal device in performing step S101 and step S102 in FIG. 7, step S101 and step S102 in FIG. 9, step S101, step S102, and step S106 in FIG. 10, step S101, step S102, and step S107 in FIG. 11, S101, S102, and S108 in FIG. 12, and step S101, step S102, and step S109 in FIG. 13.

In an example, the transmitter/receiver 1102 is configured to support the terminal device in sending data/signaling to another terminal device or the network device. For example, the transmitter/receiver 1102 is configured to support the terminal device in performing step S104 separately in FIG. 7 and FIG. 9 to FIG. 13.

In an example, the communications unit 1101 is configured to support the terminal device in communicating with another terminal device or the network device, for example, configured to support the terminal device in communicating with another terminal device shown in FIG. 7.

The controller/processor configured to perform functions of the terminal device in the embodiments of the present application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present application. Alternatively, the processor may be a combination of processors implementing a computing function, for example, a combination of one or more microprocessors, or a combination of the DSP and a microprocessor.

Method or algorithm steps described in combination with the content disclosed in the present application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in the terminal device as discrete components.

A person skilled in the art should be aware that in the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

Figure 15:
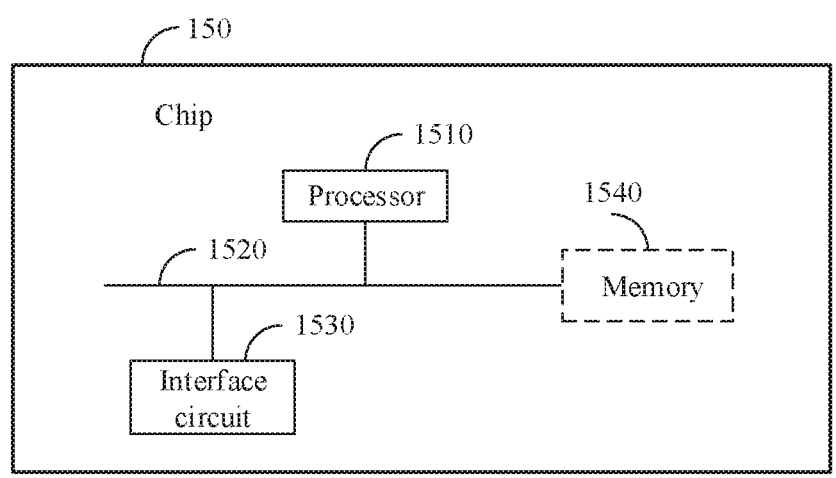
FIG. 15 is a schematic structural diagram of a chip according to this application.

FIG. 15 is a schematic structural diagram of a chip 150 according to an embodiment of the present application. The chip 150 includes at least one processor 1510 and an interface circuit 1530.

Optionally, the chip 150 further includes a memory 1540. The memory 1540 may include a read-only memory and a random access memory, and provides an operation instruction and data for the processor 1510. A part of the memory 1540 may further include a non-volatile random access memory (NVRAM).

In some implementations, the memory 1540 stores the following elements: an executable module or data structure, a subset thereof, or an extended set thereof. In this embodiment of the present application, an operation instruction (the operation instruction may be stored in an operating system) stored in the memory 1540 is invoked to perform a corresponding operation.

The processor 1510 controls an operation of the terminal device, and the processor 1510 may also be referred to as a central processing unit (CPU). The memory 1540 may include a read-only memory and a random access memory, and provide an instruction and data for the processor 1510. A part of the memory 1540 may further include a non-volatile random access memory (NVRAM). In a specific application, the processor 1510, the interface circuit 1530, and the memory 1540 are coupled together by using a bus system 1520, where the bus system 1520 includes a power supply bus, a control bus, a status signal bus, and the like in addition to a data bus. However, for clear description, various types of buses in FIG. 15 are marked as the bus system 1520.

The methods disclosed in the foregoing embodiments of the present application may be applied to the processor 1510, or implemented by the processor 1510. The processor 1510 may be an integrated circuit chip and has a signal processing capability. In an implementation process, steps in the foregoing methods can be implemented by using a hardware integrated logic circuit in the processor 1510, or by using instructions in a form of software. The processor 1510 may be a general-purpose processor, a digital signal processor (DSP), an application specific integrated circuit (ASIC), a field-programmable gate array (FPGA) or another programmable logical device, a discrete gate or transistor logic device, or a discrete hardware component. It may implement or perform the methods, the steps, and logical block diagrams that are disclosed in the embodiments of the present application. The general-purpose processor may be a microprocessor, or the processor may be any conventional processor or the like. Steps of the methods disclosed with reference to the embodiments of the present application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1540, and a processor 1510 reads information in the memory 1540 and completes the steps in the foregoing methods in combination with hardware of the processor.

Optionally, the interface circuit 1530 is configured to perform steps of receiving and sending performed by the terminal device in the embodiments shown in FIG. 7, FIG. 9, FIG. 10, FIG. 11, FIG. 12, and FIG. 13. The processor 1510 is configured to perform steps processed by the terminal device in the embodiments shown in FIG. 7, FIG. 9, FIG. 10, FIG. 11, FIG. 12, and FIG. 13.

In the foregoing embodiment, the instruction that is stored in the memory and that is to be performed by the processor may be implemented in a form of a computer program product. The computer program product may be written in the memory in advance, or may be downloaded and installed in the memory in a form of software.

The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state drive (SSD)), or the like.

According to one aspect, a computer storage medium is provided. The computer readable storage medium stores an instruction, and when the instruction is run, the terminal device performs S101, S102, S106, S107, S108, S109, S110, S1012, S103, S105, S1051, S1052, S1053, S1054, S1031, S1032, S1033, S1034, S1035, S1036, S1037, S1038, S1039, S111, S1011, S112, and S104 in the embodiment, and/or other processes performed by the terminal device in the technology described in this specification.

According to one aspect, a computer program product including an instruction is provided. The computer program product stores an instruction, and when the instruction is run, the terminal device is enabled to perform S101, S102, S106, S107, S108, S109, S110, S1012, S103, S105, S1051, S1052, S1053, S1054, S1055, S1056, S1031, S1032, S1033, S1034, S1035, S1036, S1037, S1038, S1039, S111, S1011, S112, and S104 in the embodiment, and/or other processes performed by the terminal device in the technology described in this specification.

According to one aspect, a chip is provided, and the chip is applied to a terminal device. The chip includes at least one processor and an interface circuit, and the interface circuit and the at least one processor are connected by using a line. The processor is configured to run an instruction to perform S101, S102, S106, S107, S108, S109, S110, S1012, S103, S105, S1051, S1052, S1053, S1054, S1055, S1056, S1031, S1032, S1033, S1034, S1035, S1036, S1037, S1038, S1039, S111, S1011, S112, and S104 in the embodiment, and/or other processes performed by the terminal device in the technology described in this specification.

Embodiments in this application may be combined or mutually referenced according to internal logic of the technical solution to form a new embodiment. Details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service transmission method, comprising:
    selecting, by a terminal device, a direct link transmission resource from a first transmission resource set corresponding to radio resource information, and wherein transmission characteristic information corresponding the radio resource information is using a second modulation and coding scheme (MCS) index table, and the first transmission characteristic is a transmission characteristic supported by the transmission characteristic information; and the transmission characteristic information comprises a second minimum MCS index in the second MCS index table and a second maximum MCS index in the second MCS index table, and the second MCS index table is an MCS index table of supporting 64 quadrature amplitude modulation (QAM) on the direct link transmission resource;
    obtaining, by the terminal device, a first identifier corresponding to the radio resource information, wherein the first identifier comprises one or more first parameters;
    determining, by the terminal device, a second identifier from an upper layer of the terminal device, wherein the second identifier comprises one or more second parameters; and
    determining, by the terminal device, that the one or more first parameters are the same as the one or more second parameters and that a parameter value of each of the one or more first parameters matches a parameter value of each of the one or more second parameters; and
    in response to the determining, transmitting, by the terminal device, service data on the direct link transmission resource by using the first transmission characteristic.

2. The method according to claim 1, wherein
the transmitting, by the terminal device, service data on the direct link transmission resource by using the first transmission characteristic information comprises:
    selecting, by the terminal device, a first MCS for the service data in the second MCS index table based on at least one of the second minimum MCS index or the second maximum MCS index; and
    transmitting, by the terminal device, the service data on the direct link transmission resource by using the first MCS, and adding second MCS index table indication information and an index corresponding to the first MCS to corresponding direct link control information.

3. The method according to claim 1, the method further comprises:
    obtaining, by the terminal device, the service data.

4. The method according to claim 1, wherein the one or more first parameters comprise a service type identifier.

5. The method according to claim 4, wherein the terminal device stores a mapping relationship between the service type identifier and a transmission mode.

6. The method according to claim 1, wherein the one or more first parameters comprise a proximity service per-packet priority (PPPP) identifier.

7. The method according to claim 1, wherein the one or more first parameters comprise a quality of service (QoS) identifier.

8. The method according to claim 1, wherein the one or more first parameters comprise a reliability identifier.

9. The method according to claim 1, wherein the one or more first parameters comprise a bearer identifier.

10. The method according to claim 1, wherein the one or more first parameters comprise a delay identifier.

11. The method according to claim 1, wherein the one or more first parameters comprise a transmission rate identifier.

12. A service transmission apparatus, comprising:
    at least one processor, and
    one or more memories coupled to the at least one processor and storing programming instructions for execution by the at least one processor to cause the apparatus to:
    select a direct link transmission resource from a first transmission resource set corresponding to radio resource information; and wherein,
    transmission characteristic information corresponding the radio resource information is using a second modulation and coding scheme (MCS) index table, and the first transmission characteristic is a transmission characteristic supported by the transmission characteristic information; and the transmission characteristic information comprises a second minimum MCS index in the second MCS index table and a second maximum MCS index in the second MCS index table, and the second MCS index table is an MCS index table of supporting 64 quadrature amplitude modulation (QAM) on the direct link transmission resource;
    obtain a first identifier corresponding to the radio resource information, wherein the first identifier comprises one or more first parameters;
    determine a second identifier from an upper layer of the apparatus, wherein the second identifier comprises one or more second parameters; and
    determine that the one or more first parameters are the same as the one or more second parameters and that a parameter value of each of the one or more first parameters matches a parameter value of each of the one or more second parameters; and
    in response to the determination, transmit, by using the first transmission characteristic, service data on the direct link transmission resource.

13. The apparatus according to claim 12, wherein
the programming instructions, when executed by the at least one processor, cause the apparatus to select a first MCS for the service data in the second MCS index table based on at least one of the second minimum MCS index or the second maximum MCS index; and
transmit the service data on the direct link transmission resource by using the first MCS selected by the at least one processor, and add second MCS index table indication information and an index corresponding to the first MCS to corresponding direct link control information.

14. The apparatus according to claim 12, wherein the programming instructions, when executed by the at least one processor, cause the apparatus to
  obtain the service data.

15. A non-transitory computer readable medium storing program codes for use by a terminal device, wherein the program codes comprise instructions which when executed by a processor of the terminal device, cause the terminal device to perform the following:
  selecting a direct link transmission resource from a first transmission resource set corresponding to radio resource information, and wherein transmission characteristic information corresponding the radio resource information is using a second modulation and coding scheme (MCS) index table, and the first transmission characteristic is a transmission characteristic supported by the transmission characteristic information; and the transmission characteristic information comprises a second minimum MCS index in the second MCS index table and a second maximum MCS index in the second MCS index table, and the second MCS index table is an MCS index table of supporting 64 quadrature amplitude modulation (QAM) on the direct link transmission resource;
  obtaining a first identifier corresponding to the radio resource information, wherein the first identifier comprises one or more first parameters;
  determining a second identifier from an upper layer of the terminal device, wherein the second identifier comprises one or more second parameters; and
  determining that the one or more first parameters are the same as the one or more second parameters and that a parameter value of each of the one or more first parameters matches a parameter value of each of the one or more second parameters; and
  in response to the determining, transmitting service data on the direct link transmission resource by using the first transmission characteristic.

* * * * *